US012643574B2

(12) United States Patent

Gunbatar et al.

(10) Patent No.: US 12,643,574 B2

(45) Date of Patent: Jun. 2, 2026

(54) IN-PATH OBJECT DETECTION FOR AUTONOMOUS SYSTEMS AND APPLICATIONS

(71) Applicant: NVIDIA Corporation, Santa Clara, CA (US)

(72) Inventors: Yakup Gunbatar, Edmonds, WA (US); Stefan Campbell, Mercer Island, WA (US); Zihao Zhang, Sunnyvale, CA (US)

(73) Assignee: NVIDIA Corporation, Santa Clara, CA (US)

( * ) Notice: Subject to any disclaimer, the term of this patent is extended or adjusted under 35 U.S.C. 154(b) by 314 days.

(21) Appl. No.: 18/312,200

(22) Filed: May 4, 2023

(65) Prior Publication Data

US 2024/0367686 A1 Nov. 7, 2024

(51) Int. Cl.
| | |
|---|---|
| *B60W 60/00* | (2020.01) |
| *B60W 30/095* | (2012.01) |
| *G01S 13/42* | (2006.01) |
| *G01S 13/931* | (2020.01) |
| *G06V 20/58* | (2022.01) |

(52) U.S. Cl.
CPC .... *B60W 60/0027* (2020.02); *B60W 30/0956* (2013.01); *G01S 13/42* (2013.01); *G01S 13/931* (2013.01); *B60W 2510/20* (2013.01); *B60W 2520/06* (2013.01); *B60W 2520/14* (2013.01); *B60W 2530/201* (2020.02); *B60W 2552/30* (2020.02); *B60W 2554/4041* (2020.02); *B60W 2554/801* (2020.02); *B60W*

*2556/45* (2020.02); *G01S 2013/9322* (2020.01); *G01S 2013/9323* (2020.01); *G06V 20/58* (2022.01)

(58) Field of Classification Search
CPC ......... B60W 60/0027; B60W 30/0956; B60W 2510/20; B60W 2520/06; G01S 13/42; G01S 13/931
See application file for complete search history.

(56) References Cited

U.S. PATENT DOCUMENTS

| | | | | |
|---|---|---|---|---|
| 10,037,472 | B1 * | 7/2018 | Chen | G06V 20/58 |
| 10,556,588 | B2 * | 2/2020 | Tamura | B60W 30/14 |
| 11,609,572 | B2 | 3/2023 | Chen et al. | |
| 2015/0291215 | A1 * | 10/2015 | Bajpai | B60R 1/23 |
| | | | | 701/41 |
| 2019/0250622 | A1 | 8/2019 | Nister et al. | |

(Continued)

*Primary Examiner* — Scott A Browne
*Assistant Examiner* — Jason Nguyen
(74) *Attorney, Agent, or Firm* — IRON SUMMIT IP LLP

(57) ABSTRACT

In various examples, in-path object detection for autonomous and semi-autonomous systems and applications is described herein. For instance, systems and methods may use sensor data, such as inertial measurement sensor data, to generate or determine a lane that is associated with a vehicle. In some examples, the lane is generated or determined by determining a curvature of a path that the vehicle is navigating and then adding distance boundaries to both sides of the path. The systems and methods may then use sensor data, such as RADAR data and/or LiDAR data, to determine one or more locations of one or more objects with respect to the vehicle. Using the geometry of the lane and the location(s) of the object(s), the systems and methods may then determine whether the object(s) is located along the path of the vehicle.

20 Claims, 15 Drawing Sheets

(56)                    References Cited

U.S. PATENT DOCUMENTS

| | | | |
|---|---|---|---|
| 2019/0258251 A1 | 8/2019 | Ditty et al. | |
| 2019/0384303 A1 | 12/2019 | Muller et al. | |
| 2020/0108837 A1* | 4/2020 | Kim | B60W 30/045 |
| 2020/0249684 A1* | 8/2020 | Onofrio | G08G 1/167 |
| 2021/0001877 A1 | 1/2021 | Han et al. | |
| 2021/0094539 A1* | 4/2021 | Beller | G05D 1/0214 |
| 2021/0253093 A1* | 8/2021 | Morotomi | G08G 1/166 |
| 2021/0272304 A1* | 9/2021 | Yang | G06V 10/454 |
| 2023/0000004 A1* | 1/2023 | Schaefer | A01B 69/008 |
| 2023/0004164 A1 | 1/2023 | Onofrio et al. | |
| 2023/0205219 A1 | 6/2023 | Towal et al. | |

* cited by examiner

800

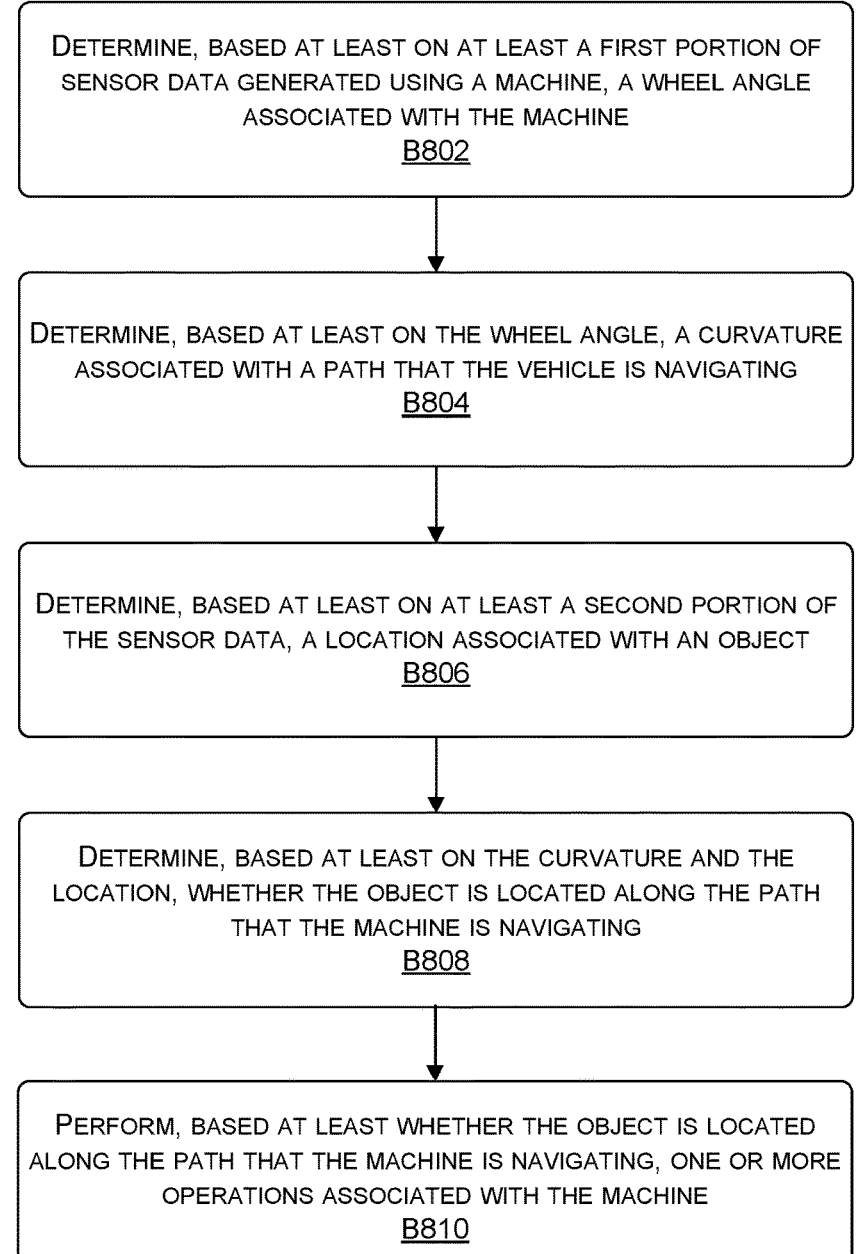

DETERMINE, BASED AT LEAST ON AT LEAST A FIRST PORTION OF
SENSOR DATA GENERATED USING A MACHINE, A WHEEL ANGLE
ASSOCIATED WITH THE MACHINE
B802

DETERMINE, BASED AT LEAST ON THE WHEEL ANGLE, A CURVATURE
ASSOCIATED WITH A PATH THAT THE VEHICLE IS NAVIGATING
B804

DETERMINE, BASED AT LEAST ON AT LEAST A SECOND PORTION OF
THE SENSOR DATA, A LOCATION ASSOCIATED WITH AN OBJECT
B806

DETERMINE, BASED AT LEAST ON THE CURVATURE AND THE
LOCATION, WHETHER THE OBJECT IS LOCATED ALONG THE PATH
THAT THE MACHINE IS NAVIGATING
B808

PERFORM, BASED AT LEAST WHETHER THE OBJECT IS LOCATED
ALONG THE PATH THAT THE MACHINE IS NAVIGATING, ONE OR MORE
OPERATIONS ASSOCIATED WITH THE MACHINE
B810

FIGURE 8A

850

DETERMINE, BASED AT LEAST ON AT LEAST A FIRST PORTION OF
SENSOR DATA GENERATED USING A MACHINE, MOTION
INFORMATION ASSOCIATED WITH THE MACHINE
B852

DETERMINE, BASED AT LEAST ON THE MOTION INFORMATION, A
FIRST DISTANCE ASSOCIATED WITH A SIGHT OF THE MACHINE
B854

DETERMINE, BASED AT LEAST ON AT LEAST A SECOND PORTION OF
THE SENSOR DATA, A SECOND DISTANCE ASSOCIATED WITH AN
OBJECT
B856

IS THE SECOND DISTANCE
LESS THAN OR EQUAL TO THE FIRST
DISTANCE
B858

YES

NO

DETERMINE IF THE OBJECT IS LOCATED
ALONG A PATH OF THE MACHINE
B860

PERFORM ONE OR MORE OPERATIONS
B862

FIGURE 8B

STEREO CAMERA 968

MID-RANGE CAMERA, WING MIRROR MOUNT 998

SURROUND CAMERA 974

MID-RANGE CAMERA, WING MIRROR MOUNT 998

SURROUND CAMERA(S) 974

SURROUND CAMERA(S) 974

INFRARED CAMERA 972

WIDE VIEW CAMERA 970

LONG-RANGE CAMERA 998

LONG-RANGE CAMERA 998

STEREO CAMERA 968

SERVER(S) 978

CPU 980(B)

CPU 980(A)

PCIE SWITCH 982(D)

PCIE SWITCH 982(C)

PCIE SWITCH 982(B)

PCIE SWITCH 982(A)

GPU 984(F)

GPU 984(H)

GPU 984(E)

GPU 984(G)

GPU 984(B)

GPU 984(D)

GPU 984(A)

GPU 984(C)

986

988

976

900

994

992

NETWORK(S) 990

1000

MEMORY
1004

I/O COMPONENTS
1014

CPU(s)
1006

POWER SUPPLY
1016

GPU(s)
1008

PRESENTATION
COMPONENT(S)
1018

COMM. INTERFACE
1010

LOGIC UNIT(S)
1020

I/O PORT(S)
1012

1002

1100

IN-PATH OBJECT DETECTION FOR AUTONOMOUS SYSTEMS AND APPLICATIONS

BACKGROUND

Vehicles, such as autonomous and/or semi-autonomous vehicles, may include safety systems, such as forward collision warning systems, that alert the vehicles and/or users of the vehicles when there are potential collisions with other objects—such as other vehicles located along a path of the vehicles. In order for such a safety system to operate, the safety system initially detects a lane for which a vehicle is currently navigating. To detect the lane, the safety system may process image data to determine the locations of road signatures surrounding the vehicle, such as lane markings indicating a left boundary and/or a right boundary associated with the lane. The safety system may then further process sensor data, such as the image data, RADAR data, LiDAR data, and/or the like, to determine the locations of objects within the environment. Using the locations of the objects, the safety system may then determine whether one or more of the objects are located within the same lane as the vehicle.

However, performing such processes to determine the lane for which the vehicle is navigating and/or to determine whether the objects are located within the lane may be difficult. For instance, if images represented by the image data do not depict lane signatures or features and/or only partially depict the lane signatures or features, then it may be difficult for the safety system to accurately determine which lane the vehicle is navigating and/or determine whether the objects are located within the lane. Additionally, performing such processes may require large amounts of computing resources based on the types of processing that are performed to detect the lanes (e.g., image processing, object detection, object tracking, etc.) and/or the amount of sensor data that is processed (e.g., image data, RADAR data, LiDAR data, map data, etc.). Furthermore, performing such processes may require that the vehicle to include a number of sensors and/or a number of different types of sensors (e.g., image sensors, RADAR sensors, LiDAR sensors, etc.).

SUMMARY

Embodiments of the present disclosure relate to object in-path analysis for autonomous and semi-autonomous systems and applications. Systems and methods are disclosed that determine whether one or more objects are located along a path of a vehicle based at least on a motion of the vehicle and one or more locations of the object(s). For instance, the systems and methods may use sensor data, such as inertial measurement unit sensor data, to determine a lane associated with the vehicle. In some examples, the lane information is obtained by determining a curvature of a path that the vehicle is navigating and then adding distance boundaries to both sides of the path. The systems and methods may then use sensor data, such as RADAR data and/or LiDAR data, to determine the location(s) of the object(s) with respect to the vehicle. Using the geometry of the generated lane and the location(s) of the object(s), the systems and methods may then determine whether the object(s) is located along the path of the vehicle.

In contrast to conventional systems, such as those described above, the current systems, in some embodiments, may not need to process specific types of senor data, such as image data, to determine the locations of road signatures when determining a lane for which a vehicle is navigating and/or determining whether an object is located along a path of the vehicle. Rather, the current systems may determine a lane using a location and motion of the vehicle and then use the determined lane to determine whether an object is located along a path of the vehicle. Additionally, in contrast to the conventional systems, the current systems, in some embodiments, may be able to determine whether an object is located along a path of a vehicle using less sensors, less types of sensors, and/or less sensor data (e.g., the current systems may not require using image sensors and/or image data). Using less sensors, less types or modalities of sensors, and/or less sensor data may save computing resources and/or require less hardware when performing such processes—which may reduce runtime of the system.

BRIEF DESCRIPTION OF THE DRAWINGS

The present systems and methods for detecting objects within paths for autonomous and semi-autonomous systems and applications are described in detail below with reference to the attached drawing figures, wherein:

FIG. 8A is a flow diagram showing a method for determining whether an object is located along a path of a vehicle, in accordance with some embodiments of the present disclosure;

FIG. 8B is a flow diagram showing a method for determining whether an object is relevant for path processing, in accordance with some embodiments of the present disclosure;

DETAILED DESCRIPTION

Figure 1:
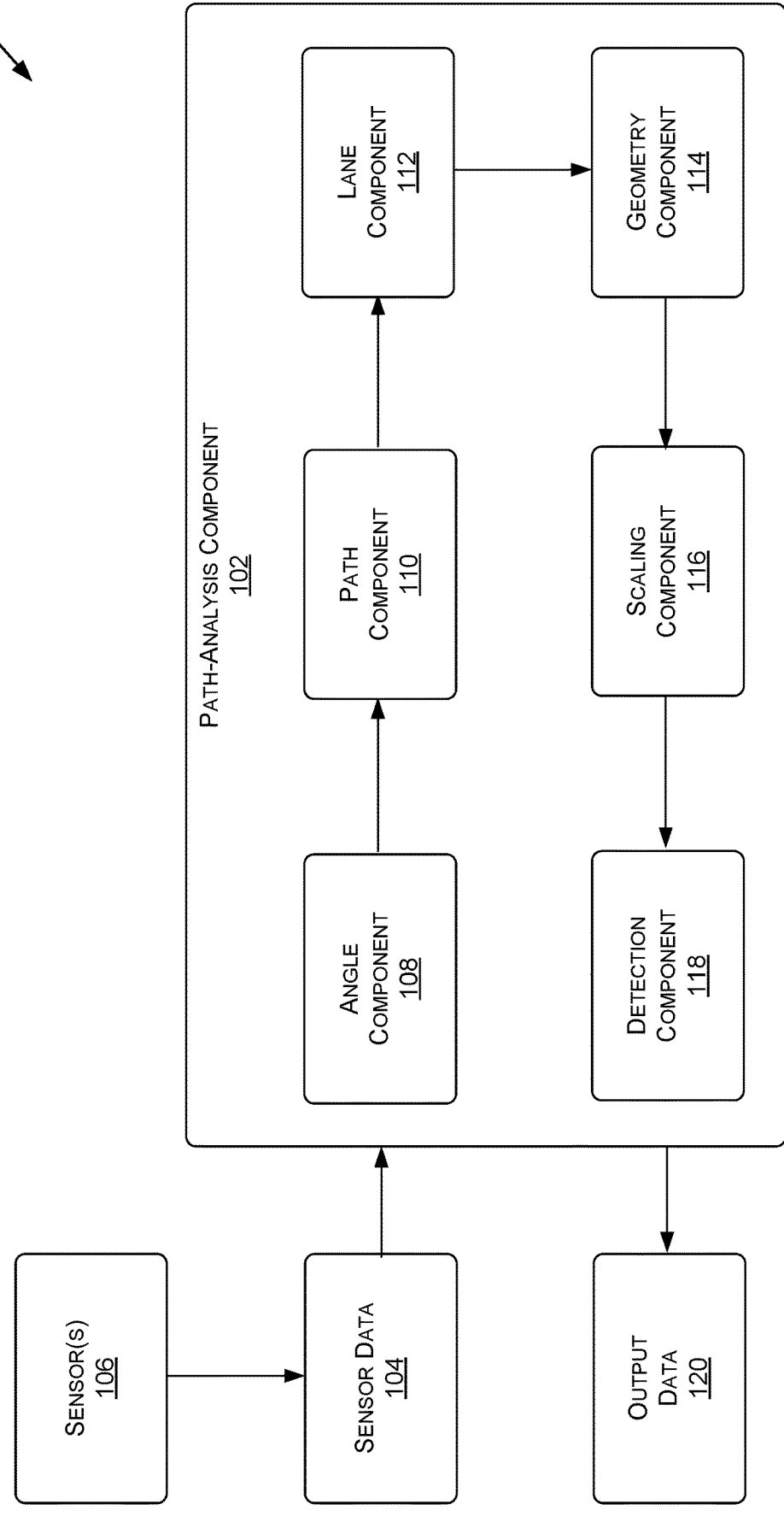
FIG. 1 illustrates an example data flow diagram for a process of determining whether an object(s) is located along a path(s) of a vehicle, in accordance with some embodiments of the present disclosure.

Systems and methods are disclosed related to object in-path analysis (OIPA) for autonomous or semi-autonomous systems and applications. Although the present disclosure may be described with respect to an example autonomous or semi-autonomous vehicle or machine 900 (alternatively referred to herein as "vehicle 900" or "ego-machine 900," an example of which is described with respect to FIGS. 9A-9D), this is not intended to be limiting. For example, the systems and methods described herein may be used by, without limitation, non-autonomous vehicles or machines, semi-autonomous vehicles or machines (e.g., in one or more adaptive driver assistance systems (ADAS)), autonomous vehicles or machines, piloted and un-piloted robots or robotic platforms, warehouse vehicles, off-road vehicles, vehicles coupled to one or more trailers, flying vessels, boats, shuttles, emergency response vehicles, motorcycles, electric or motorized bicycles, aircraft, construction vehicles, underwater craft, drones, and/or other vehicle types. In addition, although the present disclosure may be described with respect to vehicles this is not intended to be limiting, and the systems and methods described herein may be used in augmented reality, virtual reality, mixed reality, robotics, security and surveillance, autonomous or semi-autonomous machine applications, and/or any other technology spaces where object detection may be used.

For instance, a system(s) (e.g., a perception system, a planning system, a collision warning system, etc.) may receive sensor data generated using one or more sensor of a vehicle. As described herein, the sensor data may include, but is not limited to, inertial measurement unit (IMU) data generated using one or more IMU sensors, RADAR data generated using one or more RADAR sensors, LiDAR data generated using one or more LiDAR sensors, image data generated using one or more image sensors (e.g., one or more cameras), and/or any other type of sensor data generated using any other type or modality of sensor. In some examples, the system(s) may continuously receive the sensor data while the vehicle navigating through an environment, such as at various time intervals. In some examples, the system(s) may perform one or more preprocessing techniques associated with the sensor data.

The system(s) may then use at least the sensor data to determine whether one or more objects are located along a path of the vehicle. For instance, the system(s) may use at least a portion of the sensor data (e.g., the IMU data) to determine a yaw rate and/or a wheel angle associated with the vehicle. In some examples, the system(s) determines the yaw rate and/or the wheel angle over a period of time. For example, the system(s) may determine the average, the maximum, the minimum, the median, and/or any other value associated with the yaw rate and/or the wheel angle over the period of time. As described herein, the period of time may include, but is not limited to, 1 second, 3 seconds, 5 seconds, 10 seconds, and/or any other period of time.

The system(s) may then use the yaw rate and/or the wheel angle to generate a lane associated with the path that the vehicle is navigating. For instance, the system(s) may use the yaw rate and/or the wheel angle to determine a shape associated with the path. In some examples, the shape is a curvature line that is determined based at least on a turning radius associated with the vehicle. The system(s) may then use the shape (e.g., the curvature) of the path and a lane width to generate the lane. For instance, the system(s) may generate the lane such that a first boundary of the lane is located a first distance to a first side of the shape of the path and a second boundary of the lane is located a second distance to a second side of the shape of the path, where the first distance and/or the second distance are approximately equal to half of the lane width. As described herein, the lane width may include, but is not limited to, 1 meter, 2 meters, 3 meters, 5 meters, 10 meters, and/or any other distance.

The system(s) may then use the lane to determine a first distance from the vehicle to a point on the path and/or a first angle associated with the first distance. In some examples, the first distance may include a maximum line of sight distance associated with the path and the first angle may include a maximum angle associated with the maximum line of sight. The system(s) may also use at least a portion of the sensor data (e.g., the RADAR data, the LiDAR data, etc.) to determine a second distance to an object located within the environment and a second angle associated with the object. In some examples, the system(s) may determine additional information associated with the object using the sensor data, such as the direction of travel associated with the object. The system(s) may then determine whether the second distance to the object is less than the first distance.

In some examples, if the system(s) determines that the second distance to the object is greater than the first distance to the point on the path, the system(s) may determine that the object is not relevant. However, if the system(s) determines that the second distance to the object is less than the first distance to the point on the path, the system(s) may determine a third distance that is associated with a projected lateral object distance between the path and the object. In some examples, to determine the third distance, the system(s) may use the first angle, the second distance, and the second angle to determine a third angle (e.g., a scaled angle). The system(s) may then use the third angle to determine a point on the path, such as by projecting a line from the vehicle, along the third angle, and to the path. Additionally, the system(s) may then determine the third distance using a center of the object and the point on the path. While this is just one example of how the system(s) may determine the projected lateral object distance between the path and the object, in other examples, the system(s) may determine the projected lateral object distance using one or more additional and/or alternative techniques.

The system(s) may then use the third distance to determine whether the object is located along the path of the vehicle. For a first example, the system(s) may determine that the object is located along the path of the vehicle based on the third distance satisfying (e.g., being less than) a threshold distance. For a second example, the system(s) may determine that the object is not located along the path of the vehicle based on the third distance not satisfying (e.g., being equal to or greater than) the threshold distance. In either example, the threshold distance may include, but is not limited to, 1 meter, 2 meters, 3 meters, and/or any other distance.

In some examples, the system(s) may perform similar processes to determine whether one or more additional objects are located along the path of the vehicle. In some examples, the system(s) may continue to perform such processes in order continue determining whether one or more objects are located along one or more paths of the vehicle. For example, the system(s) may perform such processes at various time intervals such as, but not limited to, every 10 milliseconds, 100 milliseconds, 1 second, 2 seconds, 5 seconds, and/or any other time interval.

The systems and methods described herein may be used by, without limitation, non-autonomous vehicles, semi-autonomous vehicles (e.g., in one or more adaptive driver assistance systems (ADAS)), piloted and un-piloted robots or robotic platforms, warehouse vehicles, off-road vehicles, vehicles coupled to one or more trailers, flying vessels, boats, shuttles, emergency response vehicles, motorcycles, electric or motorized bicycles, aircraft, construction vehicles, underwater craft, drones, and/or other vehicle types. Further, the systems and methods described herein may be used for a variety of purposes, by way of example and without limitation, for machine control, machine locomotion, machine driving, synthetic data generation, model training, perception, augmented reality, virtual reality, mixed reality, robotics, security and surveillance, simulation and digital twinning, autonomous or semi-autonomous machine applications, deep learning, environment simulation, object or actor simulation, object detection, data center processing, conversational AI, light transport simulation (e.g., ray-tracing, path tracing, etc.), collaborative content creation for 3D assets, cloud computing and/or any other suitable applications.

Disclosed embodiments may be comprised in a variety of different systems such as automotive systems (e.g., a control system for an autonomous or semi-autonomous machine, a perception system for an autonomous or semi-autonomous machine), systems implemented using a robot, aerial systems, medial systems, boating systems, smart area monitoring systems, systems for performing deep learning operations, systems for performing simulation operations, systems for performing digital twin operations, systems for performing forward collision warnings, systems implemented using an edge device, systems incorporating one or more virtual machines (VMs), systems for performing synthetic data generation operations, systems implemented at least partially in a data center, systems for performing conversational AI operations, systems implementing one or more language models—such as large language models (LLMs) that process textual, audio, image, sensor, and/or other data types, systems for performing light transport simulation, systems for performing collaborative content creation for 3D assets, systems implemented at least partially using cloud computing resources, and/or other types of systems.

FIG. 1 illustrates an example data flow diagram for a process 100 of determining whether an object(s) is located along a path(s) of a vehicle, in accordance with some embodiments of the present disclosure. Other arrangements and elements (e.g., machines, interfaces, functions, orders, groupings of functions, etc.) may be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by entities may be carried out by hardware, firmware, and/or software. For instance, various functions may be carried out by a processor executing instructions stored in memory. In some embodiments, the systems, methods, and processes described herein may be executed using similar components, features, and/or functionality to those of example autonomous vehicle 900 of FIGS. 9A-9D, example computing device 1000 of FIG. 10, and/or example data center 1100 of FIG. 11.

The process 100 may include a path-analysis component 102 receiving sensor data 104 generated using one or more sensors 106. For instance, as described herein, the sensor data 104 may include, but is not limited to, inertial measurement unit (IMU) data generated using one or more IMU sensors, RADAR data generated using one or more RADAR sensors, LiDAR data generated using one or more LiDAR sensors, image data generated using one or more image sensors (e.g., one or more cameras), and/or any other type of sensor data 104 generated using any other type of sensor 106. In some examples, the sensor(s) 106 may be located on a vehicle, such as an autonomous vehicle and/or semi-autonomous vehicle, or other type of machine. In some examples, the path-analysis component 102 may preprocess the sensor data 104 and/or another system(s) may preprocess the sensor data 104 before the path-analysis component 102 receives the sensor data 104.

The process 100 may include the path-analysis component 102 using an angle component 108 to determine at least one of a yaw rate or a wheel angle associated with the vehicle. For instance, the angle component 108 may process at least a portion of the sensor data 104, such as the IMU data generated by an IMU sensor(s), to determine the yaw rate and/or the wheel angle associated with the vehicle. In some examples, the angle component 108 determines the yaw rate and/or the wheel angle over a period of time. For example, the angle component 108 may determine the average, the maximum, the minimum, the median, and/or any other value associated with the yaw rate and/or the wheel angle over the period of time. As described herein, the period of time may include, but is not limited to, 1 second, 3 seconds, 5 seconds, 10 seconds, and/or any other period of time.

In some examples, the angle component 108 may use one or more equations to determine the wheel angle associated with the vehicle. For instance, the angle component 108 may determine the wheel angle using the following equation:

$$effectivewheelangle = scalefactor \cdot wheelangle \cdot wheelanglebias \qquad (1)$$

In equation (1), wheelangle may include the actual wheel angle of the vehicle, scalarfactor is a factor multiplied to the wheelangle, and wheelanglebias is a bias term added to the wheelangle.

The process 100 may include the path-analysis component 102 using a path component 110 to determine a path of the vehicle. For instance, the path component 110 may use the yaw rate and/or the wheel angle to determine a shape associated with the path that the vehicle is navigating. In some examples, the shape is a curvature line that is determined based at least on the yaw rate and the wheel angle. For instance, the path component 110 may determine curvature of the path using the following equation:

$$\tan\delta = \frac{L}{R} = L \cdot K \qquad (2)$$

-continued $$K = \frac{1}{R} = \frac{\Psi}{V} \tag{3}$$

In equations (2) and (3), δ is the wheel angle, R is the radius of the curvature, K is the curvature, L is the length of the wheelbase of the vehicle, Ψ is the direction of the vehicle, and V is the velocity of the vehicle. Additionally to, or alternatively from equations (2) and (3), the path component 110 may determine that yaw rate=speed/turn radius.

Figure 2:
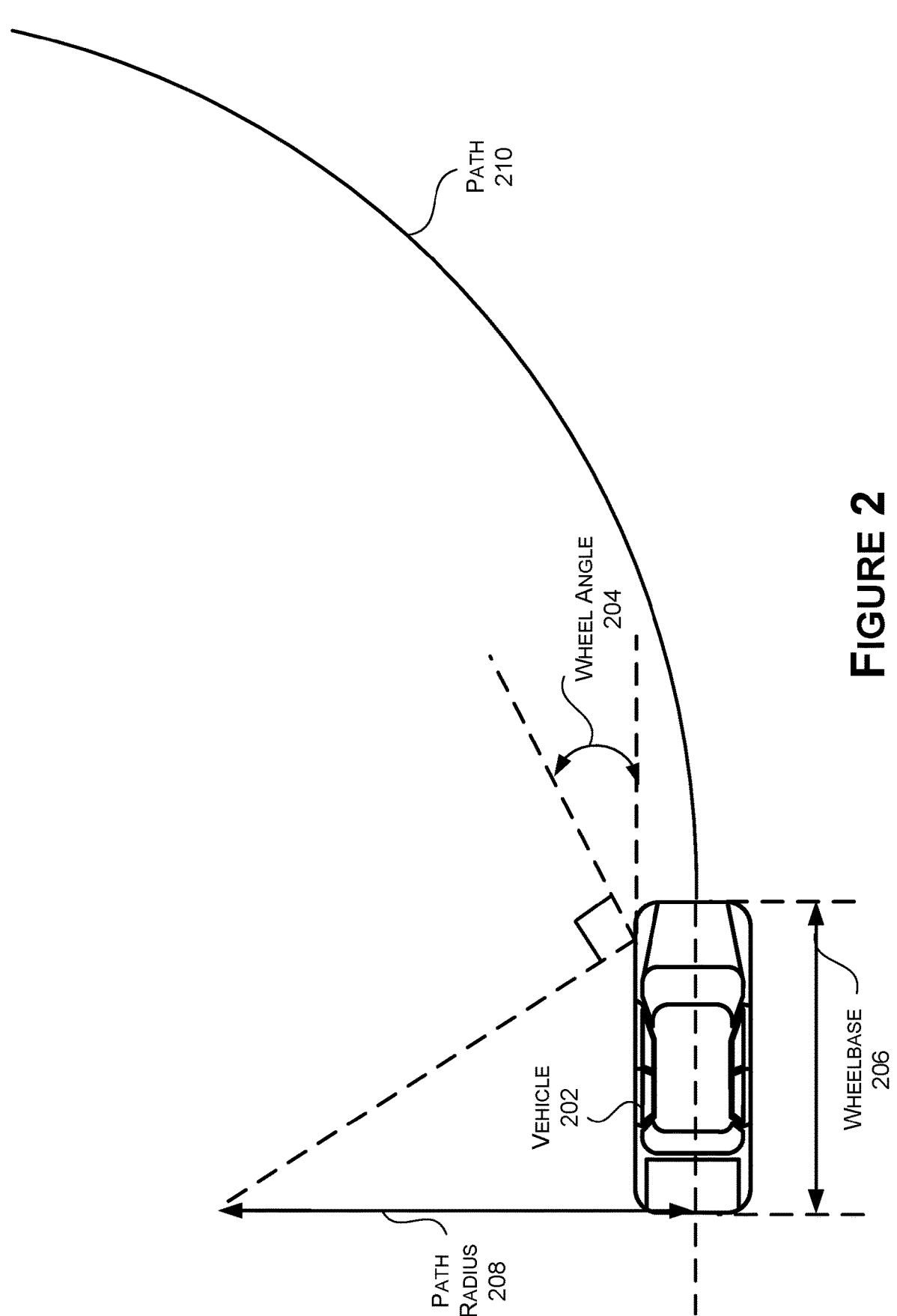
FIG. 2 illustrates an example of determining a path associated with a vehicle, in accordance with some embodiments of the present disclosure.

For instance, FIG. 2 illustrates an example of determining a path associated with a vehicle, in accordance with some embodiment of the present disclosure. In the example of FIG. 2, a vehicle 202 may be navigating around an environment. As such, the angle component 108 may perform one or more of the processes described herein to determine a wheel angle 204 associated with the vehicle 202. In some examples, the wheel angle 204 may indicate the angle of the wheels of the vehicle 202 with respect to a current orientation of the vehicle 202 (e.g., how far the wheels are turned). Additionally, the path component 110 may use the wheel angle 204 along with a wheelbase 206 associated with the vehicle 202 to determine a radius 208 of a curvature (e.g., a turn) associated with a path 210 of the vehicle 202.

While the example of FIG. 2 illustrates the path 210 as including the curvature that is based at least on the wheel angle 204 and the wheelbase 206 associated with the vehicle 202, in other examples, the path may include any other shape. For example, the path may include a shape that is associated with more than one curvature based on the vehicle 202 making various turns while navigating around the environment.

Referring back to the example of FIG. 1, the process 100 may include the path-analysis component 102 using a lane component 112 to generate a lane associated with the path that the vehicle is navigating. For instance, the lane component 112 may generate the lane by adding at least a first distance to a first side of the path in order to determine a first boundary of the lane and adding a second distance to a second side of the path in order to determine a second boundary of the lane. In some examples, the first distance and/or the second distance are equal to approximately half of a lane width associated with the lane. As described herein, the lane width may include, but is not limited to, 1 meter, 2 meters, 3 meters, 5 meters, 10 meters, and/or any other distance. In some examples, the lane component 112 may determine the lane width using one or more parameters. As described herein, a parameter for the lane width may include, but is not limited to, the wheel angle, the yaw rate, a velocity of the vehicle, an acceleration of the vehicle, a type of road (e.g., a rural road, a freeway road, etc.), a size of the vehicle, a type of the vehicle (e.g., car, van, bus, etc.), and/or any other parameter.

Figure 3:
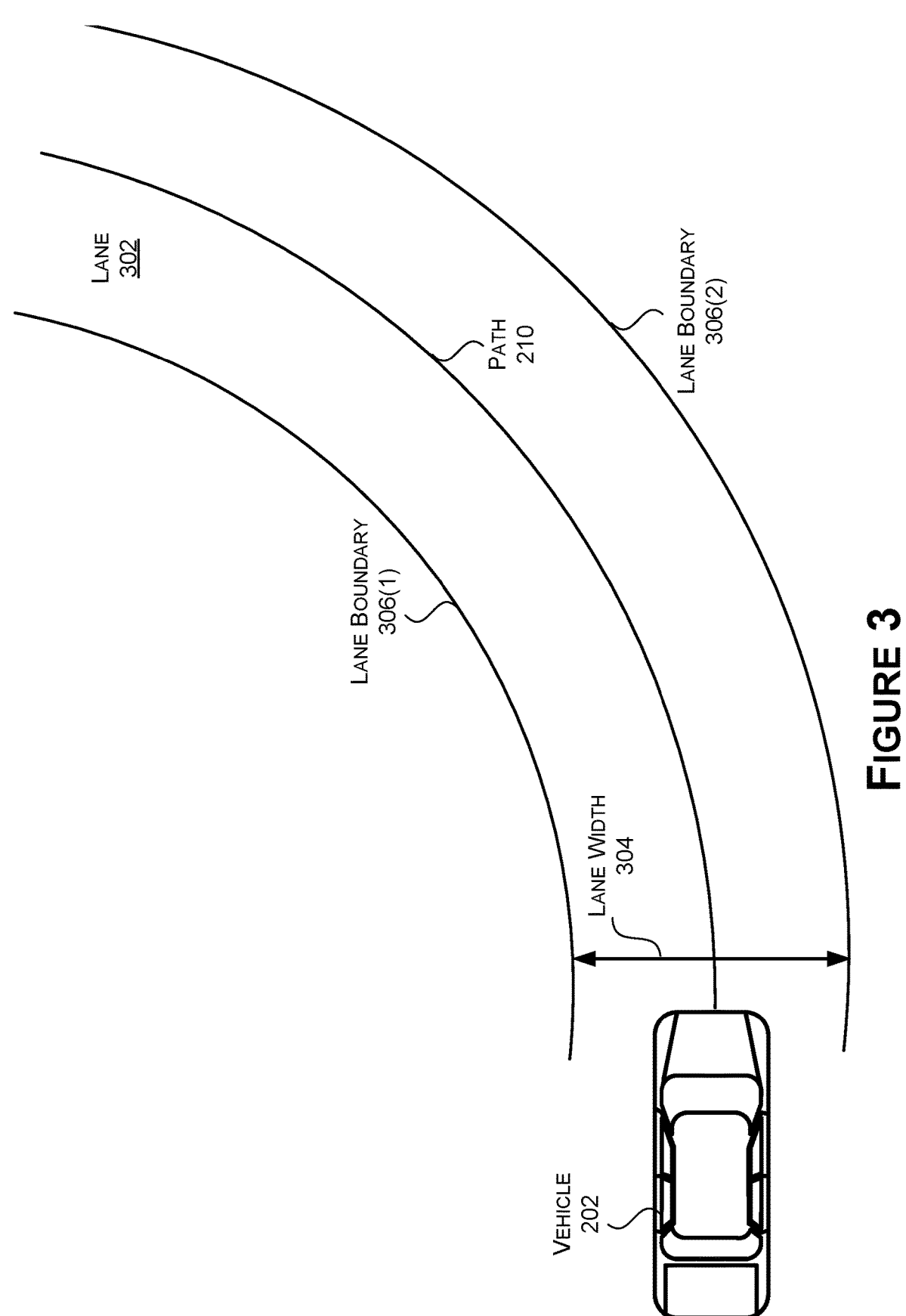
FIG. 3 illustrates an example of generating a lane associated with a path of a vehicle, in accordance with some embodiments of the present disclosure.

For instance, FIG. 3 illustrates an example of generating, determining, or obtaining a lane 302 associated with a path of the vehicle 202, in accordance with some embodiments of the present disclosure. As shown, the lane component 112 may use the path 210 and a lane width 304 to generate the lane 302 associated with the vehicle 202. In the example of FIG. 3, the lane component 112 generates the lane 302 may adding a first half the lane width 304 to a first side of the curvature of the path 210 in order to determine a first boundary 306(1) associated with the lane 302. The lane component 112 also adds a second half of the lane width 304 to a second side of the curvature of the path 210 in order to determine a second boundary 306(2) associated with the lane 302. In other words, the lane component 112 generates the lane 302 such that the path 210 extends substantially through a center of the lane 302.

In some examples, by performing these processes, the path-analysis component 102 is able to generate the lane 302 associated with the vehicle 202 without processing sensor data (e.g., image data) and/or map data to determine road signatures associated with the road that the vehicle 202 is navigating. As described herein, previous systems use such processes to determine the road signatures in order to determine a lane that the vehicle 202 is navigating within. However, processing sensor data and/or map data to determine the road signatures may require the vehicle 202 to use an increased amount of computing resources, the vehicle 202 to include one or more additional sensors, and/or the vehicle 202 to include one or more additional types of sensors as compared to the processes illustrated herein.

Referring back to the example of FIG. 1, the process 100 may include the path-analysis component 102 using a geometry component 114 to determine one or more distances and/or one or more angles associated with the lane and/or one or more objects. For instance, the geometry component 114 may determine a distance (referred to, in some examples, as a "first distance") to a point along the path (e.g., along the curvature) associated with the lane. As described herein, the first distance may be associated with a maximum line of sight distance associated with the vehicle. The geometry component 114 may further determine an angle (referred to, in some examples, as a "first angle"), which may include a maximum line of sight angle, associated with the first distance. In some examples, the geometry component 114 may determine the first distance and the first angle using the following equations:

$$d_{max} = 2 \cdot \sqrt{R^2 - \left(R - \frac{L_w}{2}\right)^2} \tag{4}$$

$$\psi_{max} = a\tan\left(\frac{L_w}{\frac{d_{max}}{2}}\right) \tag{5}$$

In equations (4) and (5), $d_{max}$ is the first distance, R is again the radius of the curvature, $L_w$ is the lane width, and $\psi_{max}$ is the first angle.

The geometry component 114 may further use at least a portion of the sensor data 104 to determine a distance (referred to, in some examples, as a "second distance") to an object located within the environment and an angle (referred to, in some examples, as a "second angle") associated with the object. As described herein, the portion of the sensor data 104 may include a type of sensor data that represents distances to and/or locations of objects, such as RADAR data generated by a RADAR sensor(s), LiDAR data generated by a LiDAR sensor(s), and/or the like. For instance, the geometry component 114 may analyze the portion of the sensor data 104 to determine a location of the object. As described herein, the location of the object may indicate at least an x-coordinate location of the object, a y-coordinate location of the object, a z-coordinate location of the object, and/or the like. The geometry component 114 may then determine the second distance and the second angle using the location. For instance, the geometry component 114 may determine the second distance and the second angle by the following equations:

$$d_{object} = \sqrt{x_{object}^2 + y_{object}^2} \qquad (6)$$

$$\psi_{object} = a\tan\,(y_{object},\, x_{object}) \qquad (7)$$

In equations (6) and (7), $d_{object}$ is the distance to the object (e.g., the second distance), $x_{object}$ is the x-coordinate location of the object with respect to the vehicle, $y_{object}$ is the y-coordinate location of the object with respect to the vehicle, and $\psi_{object}$ is the angle with respect to the object (e.g., the second angle).

Figure 4:
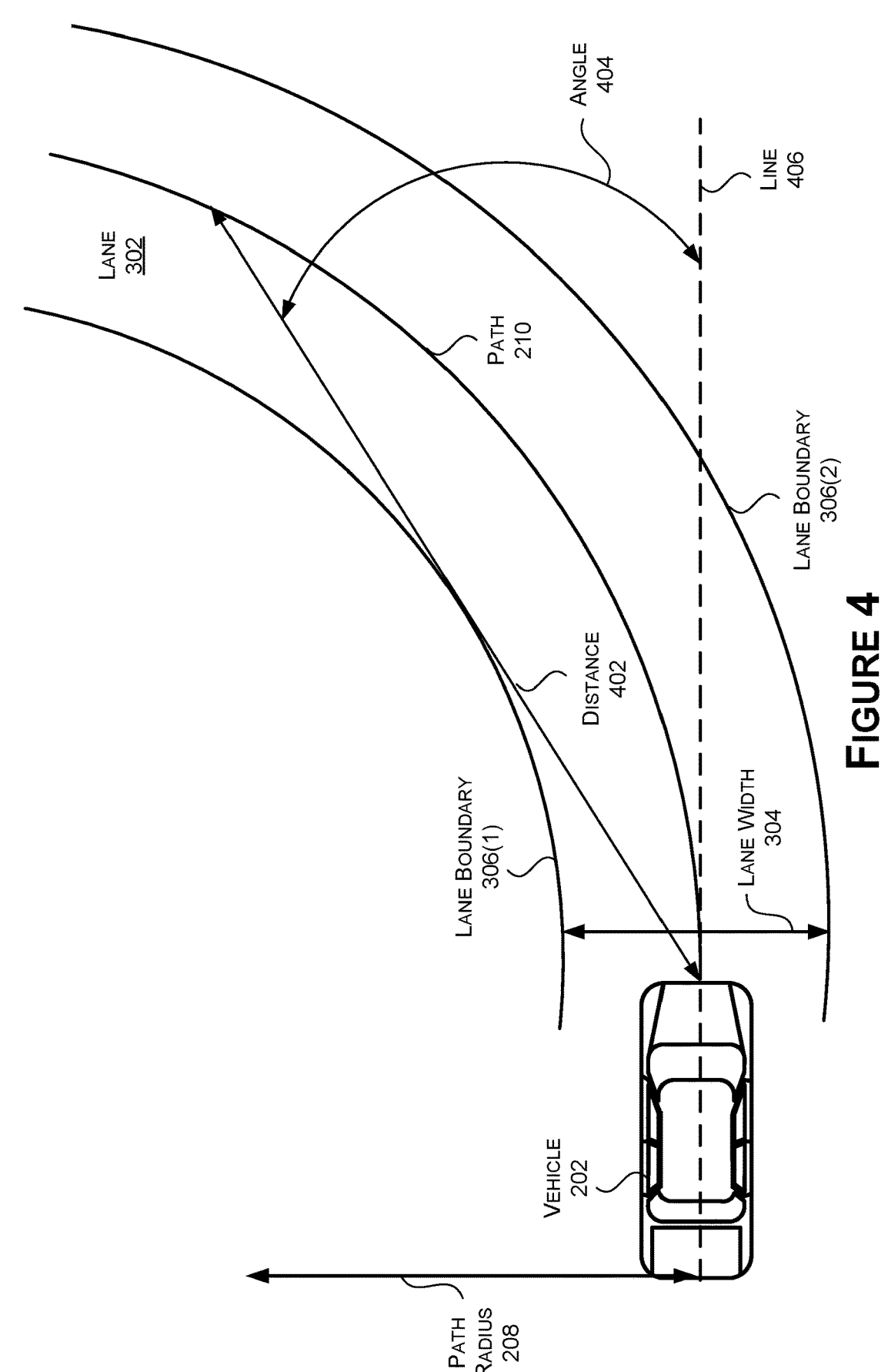
FIG. 4 illustrates an example of determining a line of sight distance and a line of sight angle associated with a lane, in accordance with some embodiments of the present disclosure.

For instance, FIG. 4 illustrates an example of determining a line of sight distance and a line of sight angle of the lane 302 associated with the vehicle 202, in accordance with some embodiments of the present disclosure. As shown, the geometry component 114 may use at least the radius 208 of the path 210 (e.g., the curvature) and the lane width 304 to determine a distance 402 to a point along the path 210 (e.g., using one or more of the equations described herein). In the example of FIG. 4, the distance 402 is determined such that the distance 402 is tangent to the first boundary 306(1) associated with the road 302. For instance, the distance 402 may represent the line of sight associated with the vehicle 202 and with respect to the lane 302.

The geometry component 114 may further use at least the lane width 304 and the distance 402 to determine an angle 404 associated with the distance 402 (e.g., using one or more of the equations described herein). As shown, the angle 404 is with respect to an orientation of the vehicle 202, where the orientation is represented by line 406. For instance, the line 406 may indicate the direction of travel of the vehicle 202 if the vehicle 202 were to continue to navigate in a straight line (e.g., the wheel angle 204 was 0 degrees).

Figure 5:
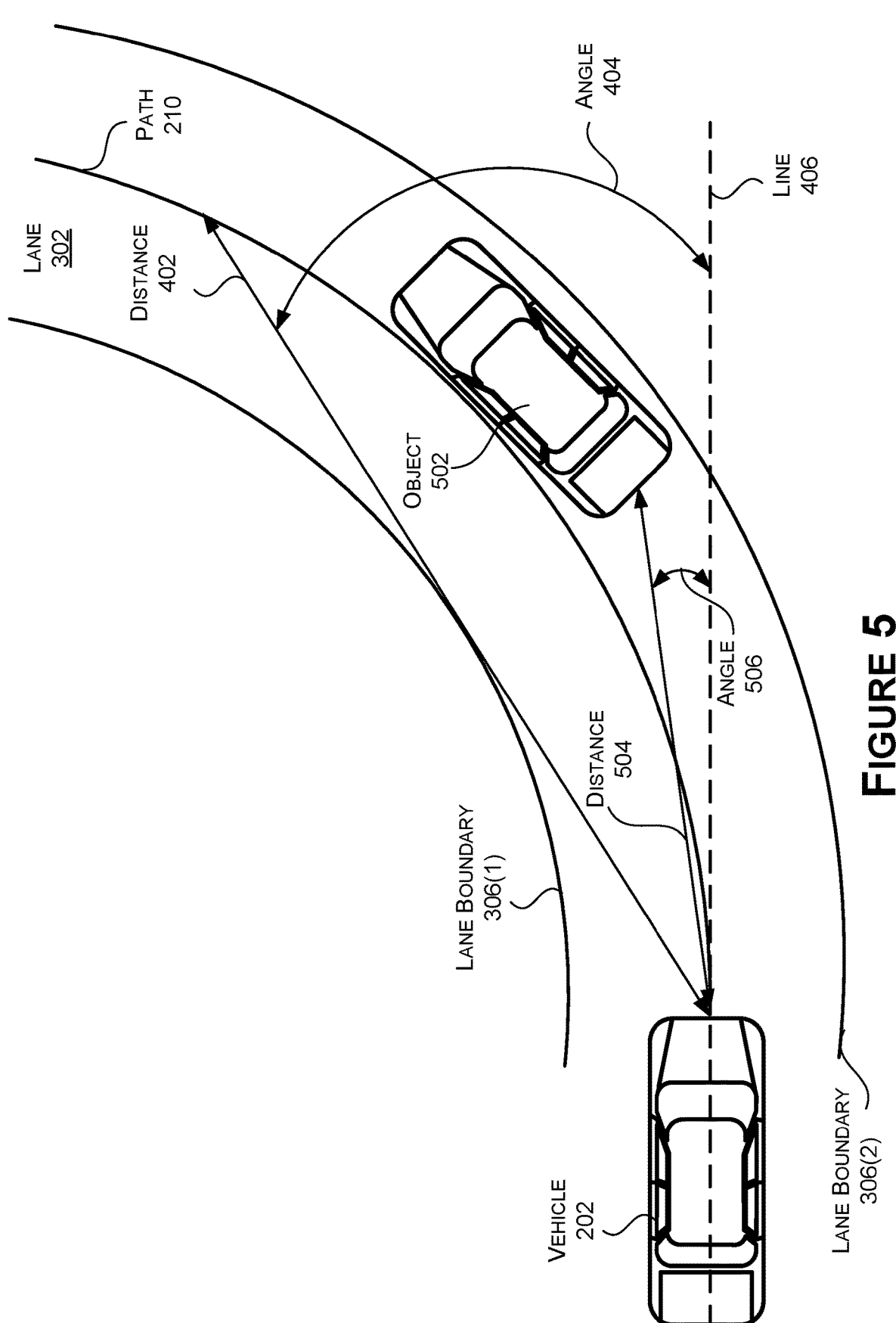
FIG. 5 illustrates an example of determining a distance and an angle associated with an object within an environment, in accordance with some embodiments of the present disclosure.

FIG. 5 illustrates an example of determining a distance and an angle associated with an object 502 within an environment, in accordance with some embodiments of the present disclosure. For instance, the geometry component 114 may process sensor data (e.g., sensor data 104) to determine a location associated with the object 502. In the example of FIG. 5, the location of the object 502 may correspond to a back-center point on the object 502. Additionally, in some examples, the location indicates at least the x-coordinate location and y-coordinate location associated with the point on the object 502. The geometry component 114 may then determine a distance 504 to the object 502 (e.g., the point on the object 502) based at least on the location of the object 502 (e.g., using one or more of the equations described herein). Additionally, the geometry component 114 may determine an angle 506 associated with the object 502 using the location of the object 502 (e.g., using one or more of the equations described herein). Similar to the angle 404, the angle 506 is with respect to the orientation of the vehicle 202.

Referring back to the example of FIG. 1, the process 100 may include the path-analysis component 102 using a scaling component 116 to determine a distance (referred to, in some examples, as a "third distance") and/or an angle (referred to, in some examples, as a "third angle") by performing scaling associated with an object. In some examples, the third distance and the third angle may be associated with a point on the path (e.g., the curvature) that is closest to the point on the object associated with the second distance and the second angle. For instance, the scaling component 116 may determine the third distance and/or the third angle based on the object not being centered on the path. Additionally, in some examples, the scaling component 116 may determine the third distance and/or the third angle based on the second distance to the object being less than the first distance (e.g., the maximum distance) associated with the line of sight of the vehicle.

In some examples, the scaling component 116 may determine the third distance and/or the third angle using the following equations:

$$\psi_{scaled} = \psi_{max}\left(\frac{d_{object}}{d_{max}}\right) \qquad (8)$$

In equation (8), $\psi_{scaled}$ is the third angle (e.g., the scaled angle).

The process 100 may also include the scaling component 116 determining a distance (referred to, in some examples, as a "fourth distance") between a point on the path and a point on the object. In some examples, the fourth distance includes a projected lateral object distance between the point on the object associated with the second distance and the point on the path associated with the third distance. As such, in some examples, the scaling component 116 may determine the fourth distance based at least on the second distance to the object, the second angle associated with the object, and the third angle associated with the path. For instance, the scaling component 116 may determine the fourth distance using the following equation:

$$d_{lateral} = d_{object}(\psi_{object} - \psi_{scaled}) \qquad (9)$$

In equation (9), $d_{lateral}$ is the fourth distance, such as the projected lateral object distance.

Figure 6:
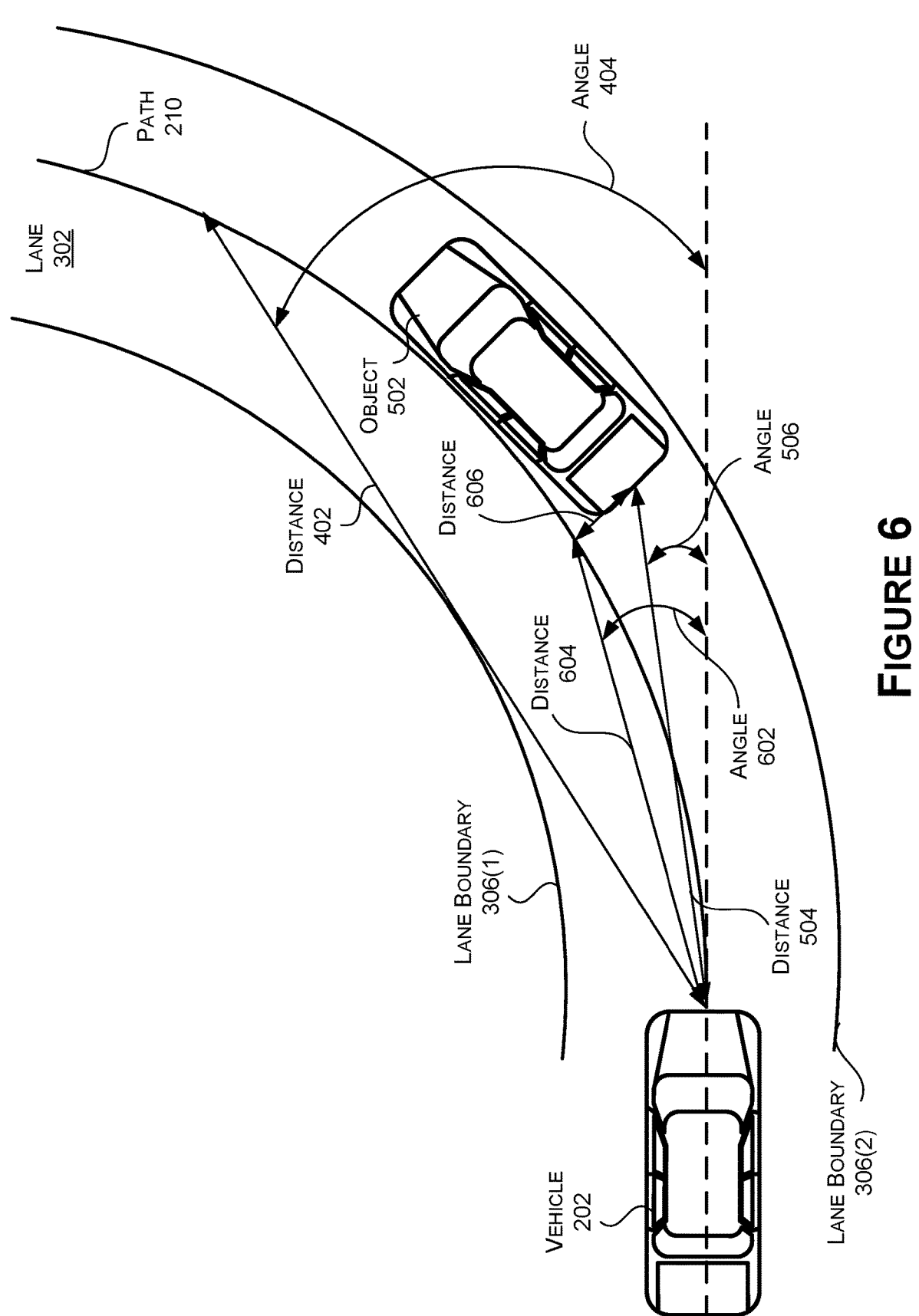
FIG. 6 illustrates an example of determining a projected lateral object distance associated with an object, in accordance with some embodiments of the present disclosure.

For instance, FIG. 6 illustrates an example of determining a projected lateral object distance associated with the object 502, in accordance with some embodiments of the present disclosure. As shown, the scaling component 116 may initially determine an angle 602 based at least on the angle 404, the distance 402, and the angle 602 (e.g., using one or more of the equations described herein). The scaling component 116 may then determine a distance 604 based at least on . . . (using one or more of the equations described herein). As described herein, the angle 602 may include the scaled angle associated with the object 502 and the distance 604 may include the scaled distance associated with the object 502.

The scaling component 116 may then determine a distance 606 based at least on the distance 504, the angle 602, and the angle 506 (e.g., using one or more of the equations described herein). As described herein, the distance 606 may include the projected lateral object distance associated with the object 502. For instance, the distance 606 is between the point on the object 502 associated with the distance 504 and the point on the path 210 associated with the distance 604.

Referring back to the example of FIG. 1, the process 100 may include the path-analysis component 102 using a detection component 118 to determine whether the object is located along the path and/or within the same lane of the vehicle. In some examples, the detection component 118 may use a threshold distance to determine whether the object is located along the path and/or within the same lane as the vehicle. For a first example, the detection component 118 may determine that the object is located along the path and/or within the same lane based on the fourth distance (e.g., the projected lateral object distance) satisfying (e.g., being less than) the threshold distance. For a second example, the detection component 118 may determine that the object is not located along the path and/or is not within the same lane based on the fourth distance not satisfying (e.g., being equal to or greater than) the threshold distance. As described herein, the threshold distance may include, but is not limited to, 1 meter, 2 meters, 3 meters, and/or any other distance.

Figure 7:
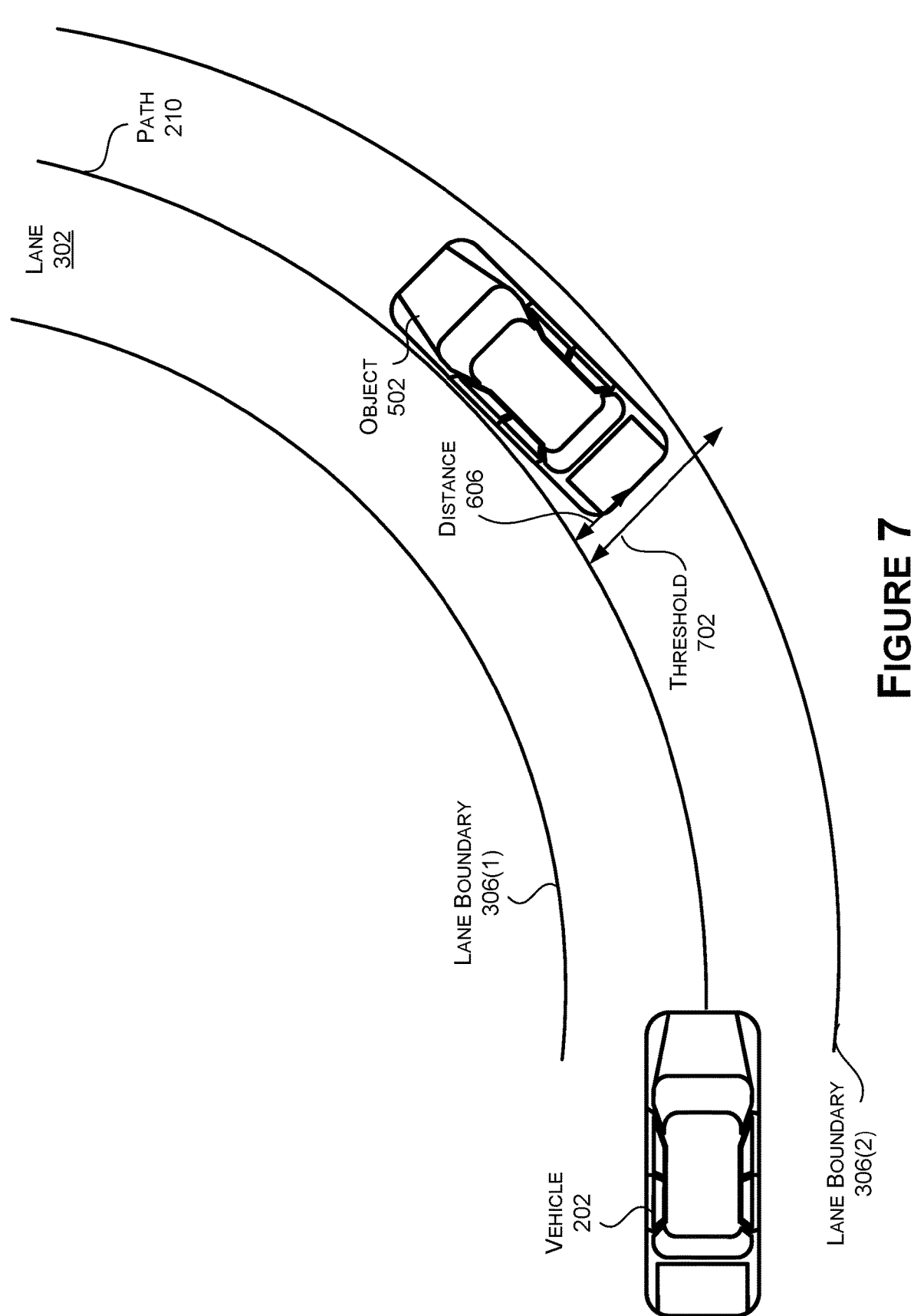
FIG. 7 illustrates an example of using a threshold distance to determine whether an object is located along a path of a vehicle, in accordance with some embodiments of the present disclosure.

For instance, FIG. 7 illustrates an example of using a threshold distance 702 to determine whether the object 502 is located along the path 210 of the vehicle 202, in accordance with some embodiments of the present disclosure. For instance, and as shown, the detection component 118 may use the distance 606 and the threshold distance 702 to determine whether the object 502 is located along the path 210 and/or within the lane 302. For instance, and in the example of FIG. 7, the detection component 118 may determine that the distance 606 satisfies (e.g., is less than) the threshold distance 702. Based on that determination, the detection component 118 may determine that the object 502 is located along the path 210 and/or within the lane 302.

Referring back to the example of FIG. 1, in some examples, the detection component 118 may perform one or more additional and/or alternative processes when determining whether an object is located along a path and/or within a lane of a vehicle. For example, and as described herein, the geometry component 114 may determine additional information associated with an object, such as by using at least a portion of the sensor data 104. In some examples, the additional information may include at least an orientation and/or a direction of travel associated with the object. As such, the detection component 118 may use the orientation and/or the direction of travel of the object to determine whether the object will remain along the path and/or within the lane of the vehicle or whether the object is just "passing through" the path and/or the lane of the vehicle.

For example, if the orientation and/or the direction of travel of the object indicates that the object is navigating in a similar direction as the vehicle, then the detection component 118 may determine that the object will remain along the path and/or within the lane of the vehicle. However, if the orientation and/or the direction of travel of the object indicates that the object is navigating in a different direction from the vehicle, then the detection component 118 may determine that the object will not remain along the path and/or will not remain within the lane of the vehicle. In such an example, the detection component 118 may make the determination since the object is likely just crossing the path and/or the lane of the vehicle, such as when the vehicle is approaching an intersection and the object is navigating on a road that crosses the road of the vehicle.

In some examples, the detection component 118 may determine that the orientation and/or the direction of travel of the object is similar to the direction of travel of the vehicle based on the directions of travel (e.g., the direction of travel of the object may be determined based on the orientation of the object) being within a threshold angle. The threshold angle may include, but is not limited to, 1 degree, 5 degrees, 10 degrees, 20 degrees, and/or any other angle. In some examples, the detection component 118 may determine the threshold angle using one or more parameters. As described herein, a parameter for determining the threshold angle may include, but is not limited to, the wheel angle of the vehicle, the yaw rate of the vehicle, the velocity of the vehicle, the acceleration of the vehicle, the type of road (e.g., a rural road, a freeway road, etc.), the size of the vehicle, a type of the vehicle (e.g., car, van, bus, etc.), and/or any other parameter.

As further illustrated in the example of FIG. 1, the process 100 may include the path-analysis component 102 generating output data 120. In some examples, the output data 120 may indicate at least an identifier associated with an object, an indication that the object is located along the path and/or located within the lane of the vehicle, and/or an indication that the object is not located along the path and/or located outside of the lane of the vehicle. In some examples, the path-analysis component 102 (and/or another component) may send the output data 120 to one or more other systems of the vehicle, such as a planning system, a forward collision warning system, and/or any other type of system associated with the vehicle.

In some examples, the path-analysis component 102 may perform similar processes to determine whether one or more other objects located within the environment are located along the path of the vehicle and/or located within the lane associated with the vehicle. In some examples, the path-analysis component 102 may continue to perform similar processes as the path-analysis component 102 continues to receive new sensor data 104 generated using the sensor(s) 106. For instance, the path-analysis component 102 may perform these processes at given time instances, such as every 10 milliseconds, 100 milliseconds, 1 second, 2 seconds, 5 seconds, and/or any other time interval.

In some examples, the path-analysis component 102 may determine other information associated with one or more objects using one or more processes that are similar to the process 100. For example, the path-analysis component 102 may determine whether an object located within a lane that is proximate (e.g., next) to a lane that the vehicle is navigating. In such an example, the path-analysis component 102 may make the determination based on the fourth distance (e.g., the projected lateral object distance) and/or the third angle (e.g., the scaled angle). For instance, the path-analysis component 102 may determine that an object located in a lane that is proximate to a lane that the vehicle is navigating based on the fourth distance being within a distance range and/or based on the third angle being within an angle range.

Now referring to FIGS. 8A-8B, each block of methods 800 and 850, described herein, comprises a computing process that may be performed using any combination of hardware, firmware, and/or software. For instance, various functions may be carried out by a processor executing instructions stored in memory. The methods 800 and 850 may also be embodied as computer-usable instructions stored on computer storage media. The methods 800 and 850 may be provided by a standalone application, a service or hosted service (standalone or in combination with another hosted service), or a plug-in to another product, to name a few. In addition, the methods 800 and 850 are described, by way of example, with respect to FIG. 1. However, the methods 800 and 850 may additionally or alternatively be executed by any one system, or any combination of systems, including, but not limited to, those described herein.

FIG. 8A is a flow diagram showing a method 800 for determining whether an object is located along a path of a machine, in accordance with some embodiments of the present disclosure. The method 800, at block B802, may include determining, based at least on at least a first portion of sensor data generated using a machine, a wheel angle (and/or a yaw rate) associated with the machine. For instance, the path-analysis component 102 (e.g., the angle component 108) may receive the sensor data 104 generated using the sensor(s) 106 of the machine. The path-analysis component 102 may then analyze at least the first portion of the sensor data 104 to determine the wheel angle associated with the machine. In some examples, the at least the first portion of the sensor data 104 is associated with one or more first sensors 106, such as IMU data generated using an IMU sensor(s) of the machine.

The method 800, at block B804, may include determining, based at least on the wheel angle, a curvature associated with a path that the machine is navigating. For instance, the path-analysis component 102 (e.g., the path component 110) may use the wheel angle (and/or the yaw rate) to determine the curvature associated with the path that the machine is navigating. In some examples, the path-analysis component 102 uses the wheel angles (and/or the yaw rates) determined over a period of time to determine the curvature associated with the path that the machine is navigating. Additionally, in some examples, the path-analysis component 102 (e.g., the lane component 112) may use the path to determine a lane associated with the machine. For instance, the path-analysis component 102 may determine the lane by adding a lane width to the path.

The method 800, at block B806, may include determining, based at least on at least a second portion of the sensor data, a location associated with an object. For instance, the path-analysis component 102 (e.g., the geometry component 114) may analyze at least the second portion of the sensor data 104 to determine the location associated with the object. In some examples, the at least the second portion of the sensor data 104 is associated with one or more second sensors 106, such as RADAR data generated using a RADAR sensor(s) of the machine and/or LiDAR data generated using a LiDAR sensor(s) of the machine. In some examples, the path-analysis component 102 may use the location to determine additional information associated with the object, such as a distance to the object and/or an angle associated with the object.

The method 800, at block B808, may include determining, based at least on the curvature and the location, whether the object is located along the path that the machine is navigating. For instance, the path-analysis component 102 (e.g., the geometry component 114) may determine a distance (e.g., a maximum distance) associated with a line of sight of the machine and an angle (e.g., a maximum angle) associated with the line of sight of the machine. The path-analysis component 102 (e.g., the scaling component 116) may then use the distance associated with the line of sight, the angle associated with the line of sight, and the location of the object (e.g., the distance to the object, the angle associated with the object, etc.) to determine a lateral distance between the object and a point on the path.

The path-analysis component 102 (e.g., the detection component 118) may then use the lateral distance to determine whether the object is located along the path of the machine. For example, the path-analysis component 102 may determine that the object is located along the path when the lateral distance satisfies (e.g., is less than) a threshold distance or determine that the object is not located along the path when the lateral distance does not satisfy (e.g., is equal to or greater than) the threshold distance. The path-analysis component 102 may then output data 120 indicating whether the object is located along the path associated with the machine.

The method 800, at block B810, may include performing, based at least on whether the object is located along the path that the machine is navigating, one or more operations associated with the machine. For a first example, if the object is not located along the path of the machine, the machine may continue to navigate along the path and/or continue to navigate using a current velocity of the machine. For a second example, if the object is located along the path of the machine and navigating at a velocity that is less than a current velocity of the machine, the machine may determine a new path to navigate in order to avoid the object and/or determine a new velocity to use when navigating (e.g., determine a velocity that slows and/or stops the machine). For a third example, if the object is again located along the path of the machine, but navigating at a velocity that is equal to or greater than the current velocity of the machine, the machine may again continue to navigate along the path and/or continue to navigate using the current velocity of the machine. While these are just a couple example operations that may be performed by the machine, in other examples, the machine may perform additional and/or alternative operations based on whether the object is located along the path that the machine is navigating.

FIG. 8B is a flow diagram showing a method 850 for determining whether an object is relevant for path processing, in accordance with some embodiments of the present disclosure. The method 850, at block B852, may include determining, based at least on at least a first portion of sensor data generated using a machine, motion information associated with the machine. For instance, the path-analysis component 102 may receive the sensor data 104 generated using the sensor(s) 106 of the machine. The path-analysis component 102 may then analyze at least the first portion of the sensor data 104 to determine the motion information, such as a wheel angle (and/or yaw rate) associated with the machine, a velocity associated with the machine, an acceleration associated with the machine, and/or any other information associated with the motion of the machine.

The method 850, at block B854, may include determining, based at least on the motion information, a first distance associated with a sight of the machine. For instance, the path-analysis 102 may use the motion information to determine a curvature associated with a path of the machine. In some examples, the path-analysis component 102 may then use the curvature to generate a lane associated with the machine. Additionally, the path-analysis component 102 may use the curvature and/or the lane to determine the first distance. As described herein, the first distance may correspond to a maximum line of sight distance associate with the machine.

The method 850, at block B856 may include determining, based at least on at least a second portion of the sensor data, a second distance associated with an object. For instance, the path-analysis component 102 may analyze at least the second portion of the sensor data 104 to determine a location associated with the object. In some examples, the at least the second portion of the sensor data 104 is associated with one or more second sensors 106, such as RADAR data generated using a RADAR sensor(s) of the machine and/or LiDAR data generated using a LiDAR sensor(s) of the machine. The path-analysis component 102 may then use the location to determine the second distance to the object.

The method 850, at block B858, may include determining whether the second distance is less than or equal to the first distance. For instance, the path-analysis component 102 may determine whether the second distance is less than or equal to the first distance. If, at block B858, it is determined that the second distance is less than or equal to the first distance, then the method 850, at block B860, may include determining if the object is located along a path of the machine. For instance, if the path-analysis component 102 determines that the second distance is less than or equal to the first distance, then the path-analysis component 102 may determine whether the object is also located along the path of the machine. In some examples, the path-analysis component 102 may make the determination by performing at least a portion of the process 800.

However, if, at block B858, it is determined that the second distance is greater than the first distance, then the method 850, at block B862, may include performing one or more operations. For instance, if the path-analysis component 102 determines that the second distance is greater than the first distance, then the path-analysis component 102 may perform one or more operations, such as continuing to monitor the distance to the object to determine whether the distance becomes less than or equal to the first distance.

Example Autonomous Vehicle

Figure 9A:
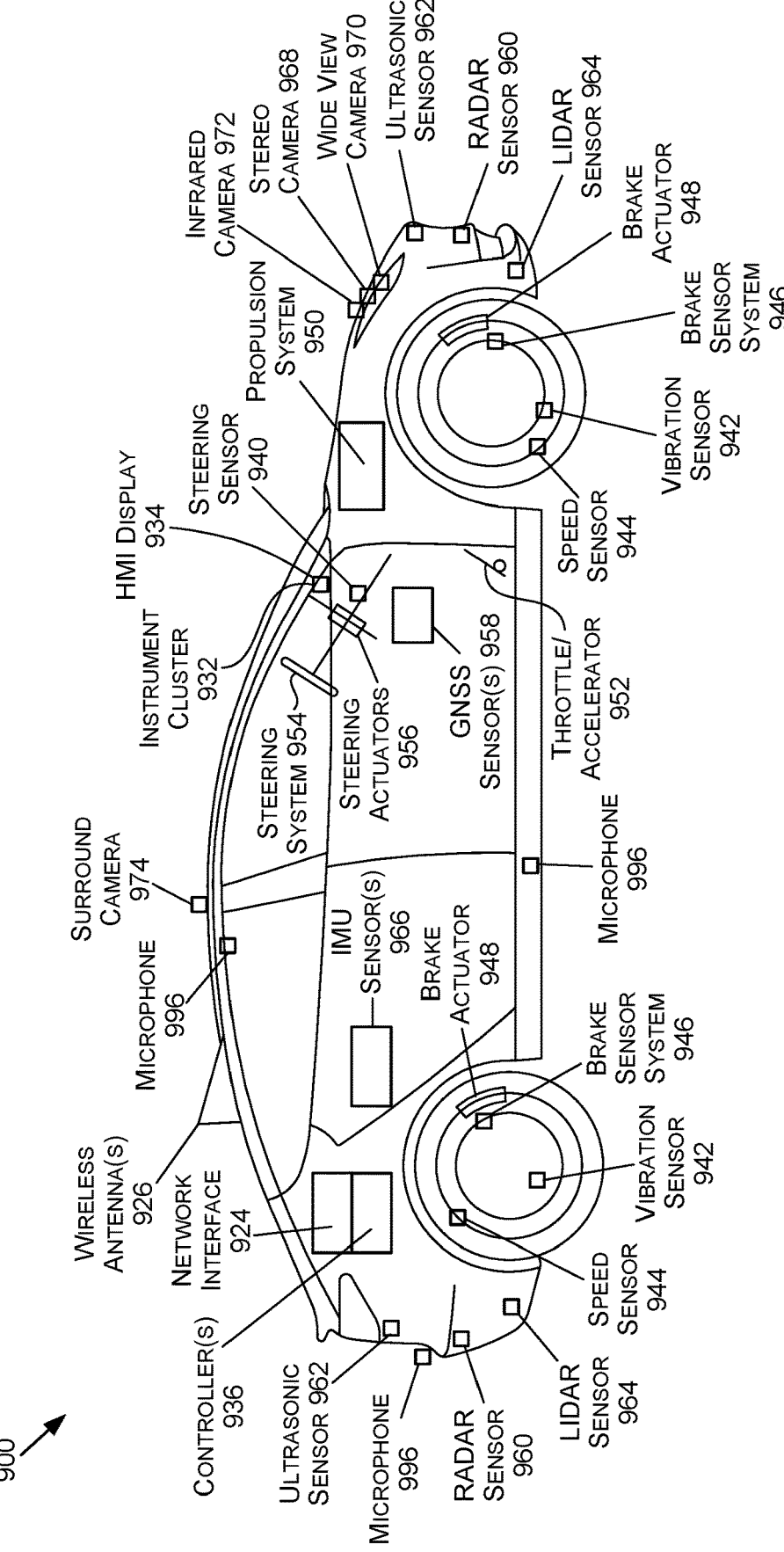
FIG. 9A is an illustration of an example autonomous vehicle, in accordance with some embodiments of the present disclosure.

FIG. 9A is an illustration of an example autonomous vehicle 900, in accordance with some embodiments of the present disclosure. The autonomous vehicle 900 (alternatively referred to herein as the "vehicle 900") may include, without limitation, a passenger vehicle, such as a car, a truck, a bus, a first responder vehicle, a shuttle, an electric or motorized bicycle, a motorcycle, a fire truck, a police vehicle, an ambulance, a boat, a construction vehicle, an underwater craft, a robotic vehicle, a drone, an airplane, a vehicle coupled to a trailer (e.g., a semi-tractor-trailer truck used for hauling cargo), and/or another type of vehicle (e.g., that is unmanned and/or that accommodates one or more passengers). Autonomous vehicles are generally described in terms of automation levels, defined by the National Highway Traffic Safety Administration (NHTSA), a division of the US Department of Transportation, and the Society of Automotive Engineers (SAE) "Taxonomy and Definitions for Terms Related to Driving Automation Systems for On-Road Motor Vehicles" (Standard No. J3016-201806, published on Jun. 15, 2018, Standard No. J3016-201609, published on Sep. 30, 2016, and previous and future versions of this standard). The vehicle 900 may be capable of functionality in accordance with one or more of Level 3-Level 5 of the autonomous driving levels. The vehicle 900 may be capable of functionality in accordance with one or more of Level 1-Level 5 of the autonomous driving levels. For example, the vehicle 900 may be capable of driver assistance (Level 1), partial automation (Level 2), conditional automation (Level 3), high automation (Level 4), and/or full automation (Level 5), depending on the embodiment. The term "autonomous," as used herein, may include any and/or all types of autonomy for the vehicle 900 or other machine, such as being fully autonomous, being highly autonomous, being conditionally autonomous, being partially autonomous, providing assistive autonomy, being semi-autonomous, being primarily autonomous, or other designation.

The vehicle 900 may include components such as a chassis, a vehicle body, wheels (e.g., 2, 4, 6, 8, 18, etc.), tires, axles, and other components of a vehicle. The vehicle 900 may include a propulsion system 950, such as an internal combustion engine, hybrid electric power plant, an all-electric engine, and/or another propulsion system type. The propulsion system 950 may be connected to a drive train of the vehicle 900, which may include a transmission, to enable the propulsion of the vehicle 900. The propulsion system 950 may be controlled in response to receiving signals from the throttle/accelerator 952.

A steering system 954, which may include a steering wheel, may be used to steer the vehicle 900 (e.g., along a desired path or route) when the propulsion system 950 is operating (e.g., when the vehicle is in motion). The steering system 954 may receive signals from a steering actuator 956. The steering wheel may be optional for full automation (Level 5) functionality.

The brake sensor system 946 may be used to operate the vehicle brakes in response to receiving signals from the brake actuators 948 and/or brake sensors.

Controller(s) 936, which may include one or more system on chips (SoCs) 904 (FIG. 9C) and/or GPU(s), may provide signals (e.g., representative of commands) to one or more components and/or systems of the vehicle 900. For example, the controller(s) may send signals to operate the vehicle brakes via one or more brake actuators 948, to operate the steering system 954 via one or more steering actuators 956, to operate the propulsion system 950 via one or more throttle/accelerators 952. The controller(s) 936 may include one or more onboard (e.g., integrated) computing devices (e.g., supercomputers) that process sensor signals, and output operation commands (e.g., signals representing commands) to enable autonomous driving and/or to assist a human driver in driving the vehicle 900. The controller(s) 936 may include a first controller 936 for autonomous driving functions, a second controller 936 for functional safety functions, a third controller 936 for artificial intelligence functionality (e.g., computer vision), a fourth controller 936 for infotainment functionality, a fifth controller 936 for redundancy in emergency conditions, and/or other controllers. In some examples, a single controller 936 may handle two or more of the above functionalities, two or more controllers 936 may handle a single functionality, and/or any combination thereof.

The controller(s) 936 may provide the signals for controlling one or more components and/or systems of the vehicle 900 in response to sensor data received from one or more sensors (e.g., sensor inputs). The sensor data may be received from, for example and without limitation, global navigation satellite systems ("GNSS") sensor(s) 958 (e.g., Global Positioning System sensor(s)), RADAR sensor(s) 960, ultrasonic sensor(s) 962, LIDAR sensor(s) 964, inertial measurement unit (IMU) sensor(s) 966 (e.g., accelerometer(s), gyroscope(s), magnetic compass(es), magnetometer(s), etc.), microphone(s) 996, stereo camera(s) 968, wide-view camera(s) 970 (e.g., fisheye cameras), infrared camera(s) 972, surround camera(s) 974 (e.g., 360 degree cameras), long-range and/or mid-range camera(s) 998, speed sensor(s) 944 (e.g., for measuring the speed of the vehicle 900), vibration sensor(s) 942, steering sensor(s) 940, brake sensor(s) (e.g., as part of the brake sensor system 946), and/or other sensor types.

One or more of the controller(s) 936 may receive inputs (e.g., represented by input data) from an instrument cluster 932 of the vehicle 900 and provide outputs (e.g., represented by output data, display data, etc.) via a human-machine interface (HMI) display 934, an audible annunciator, a loudspeaker, and/or via other components of the vehicle 900. The outputs may include information such as vehicle velocity, speed, time, map data (e.g., the High Definition ("HD") map 922 of FIG. 9C), location data (e.g., the vehicle's 900 location, such as on a map), direction, location of other vehicles (e.g., an occupancy grid), information about objects and status of objects as perceived by the controller(s) 936, etc. For example, the HMI display 934 may display information about the presence of one or more objects (e.g., a street sign, caution sign, traffic light changing, etc.), and/or information about driving maneuvers the vehicle has made, is making, or will make (e.g., changing lanes now, taking exit 34B in two miles, etc.).

The vehicle 900 further includes a network interface 924 which may use one or more wireless antenna(s) 926 and/or modem(s) to communicate over one or more networks. For example, the network interface 924 may be capable of communication over Long-Term Evolution ("LTE"), Wide-band Code Division Multiple Access ("WCDMA"), Universal Mobile Telecommunications System ("UMTS"), Global System for Mobile communication ("GSM"), IMT-CDMA Multi-Carrier ("CDMA2000"), etc. The wireless antenna(s) 926 may also enable communication between objects in the environment (e.g., vehicles, mobile devices, etc.), using local area network(s), such as Bluetooth, Bluetooth Low Energy ("LE"), Z-Wave, ZigBee, etc., and/or low power wide-area network(s) ("LPWANs"), such as LoRaWAN, SigFox, etc.

Figure 9B:
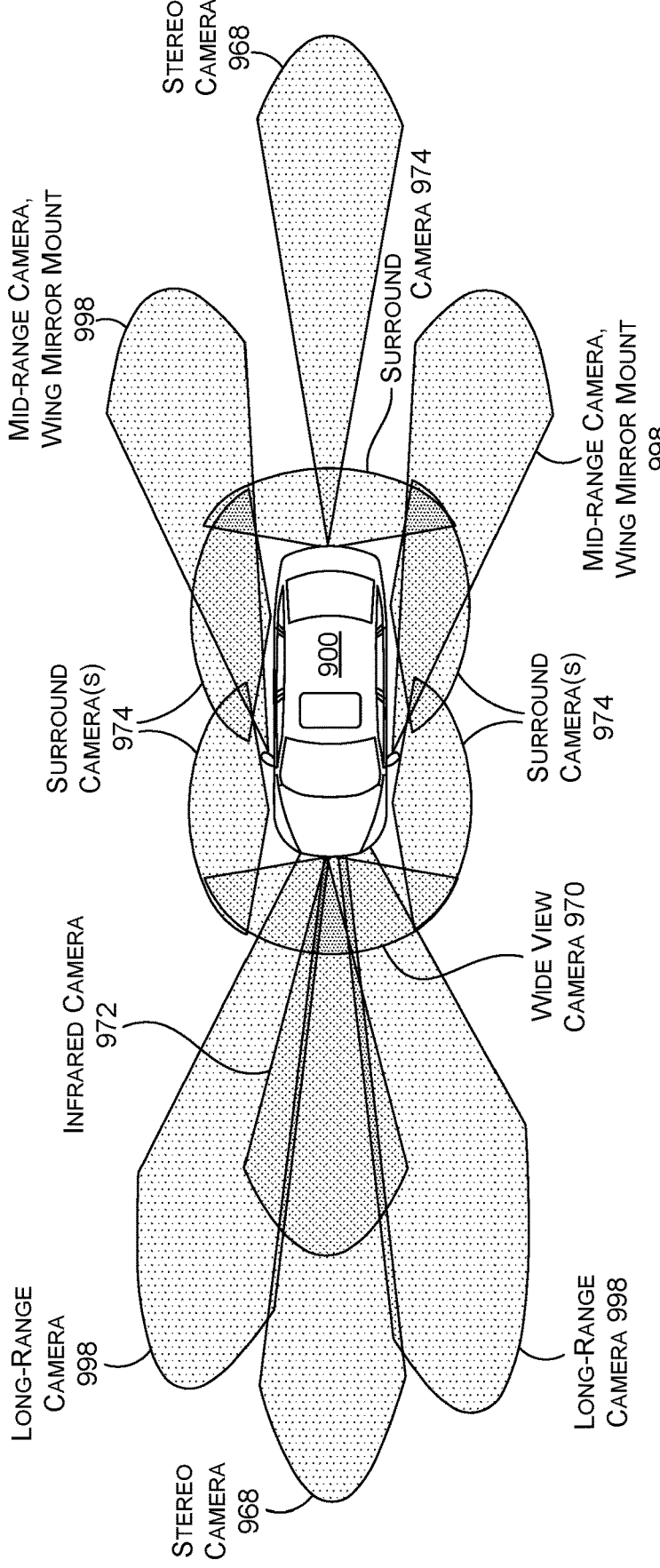
FIG. 9B is an example of camera locations and fields of view for the example autonomous vehicle of FIG. 9A, in accordance with some embodiments of the present disclosure.

FIG. 9B is an example of camera locations and fields of view for the example autonomous vehicle 900 of FIG. 9A, in accordance with some embodiments of the present disclosure. The cameras and respective fields of view are one example embodiment and are not intended to be limiting. For example, additional and/or alternative cameras may be included and/or the cameras may be located at different locations on the vehicle 900.

The camera types for the cameras may include, but are not limited to, digital cameras that may be adapted for use with the components and/or systems of the vehicle 900. The camera(s) may operate at automotive safety integrity level (ASIL) B and/or at another ASIL. The camera types may be capable of any image capture rate, such as 60 frames per second (fps), 120 fps, 240 fps, etc., depending on the embodiment. The cameras may be capable of using rolling shutters, global shutters, another type of shutter, or a combination thereof. In some examples, the color filter array may include a red clear clear clear (RCCC) color filter array, a red clear clear blue (RCCB) color filter array, a red blue green clear (RBGC) color filter array, a Foveon X3 color filter array, a Bayer sensors (RGGB) color filter array, a monochrome sensor color filter array, and/or another type of color filter array. In some embodiments, clear pixel cameras, such as cameras with an RCCC, an RCCB, and/or an RBGC color filter array, may be used in an effort to increase light sensitivity.

In some examples, one or more of the camera(s) may be used to perform advanced driver assistance systems (ADAS) functions (e.g., as part of a redundant or fail-safe design). For example, a Multi-Function Mono Camera may be installed to provide functions including lane departure warning, traffic sign assist and intelligent headlamp control. One or more of the camera(s) (e.g., all of the cameras) may record and provide image data (e.g., video) simultaneously.

One or more of the cameras may be mounted in a mounting assembly, such as a custom designed (three dimensional ("3D") printed) assembly, in order to cut out stray light and reflections from within the car (e.g., reflections from the dashboard reflected in the windshield mirrors) which may interfere with the camera's image data capture abilities. With reference to wing-mirror mounting assemblies, the wing-mirror assemblies may be custom 3D printed so that the camera mounting plate matches the shape of the wing-mirror. In some examples, the camera(s) may be integrated into the wing-mirror. For side-view cameras, the camera(s) may also be integrated within the four pillars at each corner of the cabin.

Cameras with a field of view that include portions of the environment in front of the vehicle 900 (e.g., front-facing cameras) may be used for surround view, to help identify forward facing paths and obstacles, as well aid in, with the help of one or more controllers 936 and/or control SoCs, providing information critical to generating an occupancy grid and/or determining the preferred vehicle paths. Front-facing cameras may be used to perform many of the same ADAS functions as LIDAR, including emergency braking, pedestrian detection, and collision avoidance. Front-facing cameras may also be used for ADAS functions and systems including Lane Departure Warnings ("LDW"), Autonomous Cruise Control ("ACC"), and/or other functions such as traffic sign recognition.

A variety of cameras may be used in a front-facing configuration, including, for example, a monocular camera platform that includes a complementary metal oxide semiconductor ("CMOS") color imager. Another example may be a wide-view camera(s) 970 that may be used to perceive objects coming into view from the periphery (e.g., pedestrians, crossing traffic or bicycles). Although only one wide-view camera is illustrated in FIG. 9B, there may be any number (including zero) of wide-view cameras 970 on the vehicle 900. In addition, any number of long-range camera(s) 998 (e.g., a long-view stereo camera pair) may be used for depth-based object detection, especially for objects for which a neural network has not yet been trained. The long-range camera(s) 998 may also be used for object detection and classification, as well as basic object tracking.

Any number of stereo cameras 968 may also be included in a front-facing configuration. In at least one embodiment, one or more of stereo camera(s) 968 may include an integrated control unit comprising a scalable processing unit, which may provide a programmable logic ("FPGA") and a multi-core micro-processor with an integrated Controller Area Network ("CAN") or Ethernet interface on a single chip. Such a unit may be used to generate a 3D map of the vehicle's environment, including a distance estimate for all the points in the image. An alternative stereo camera(s) 968 may include a compact stereo vision sensor(s) that may include two camera lenses (one each on the left and right) and an image processing chip that may measure the distance from the vehicle to the target object and use the generated information (e.g., metadata) to activate the autonomous emergency braking and lane departure warning functions. Other types of stereo camera(s) 968 may be used in addition to, or alternatively from, those described herein.

Cameras with a field of view that include portions of the environment to the side of the vehicle 900 (e.g., side-view cameras) may be used for surround view, providing information used to create and update the occupancy grid, as well as to generate side impact collision warnings. For example, surround camera(s) 974 (e.g., four surround cameras 974 as illustrated in FIG. 9B) may be positioned to on the vehicle 900. The surround camera(s) 974 may include wide-view camera(s) 970, fisheye camera(s), 360 degree camera(s), and/or the like. Four example, four fisheye cameras may be positioned on the vehicle's front, rear, and sides. In an alternative arrangement, the vehicle may use three surround camera(s) 974 (e.g., left, right, and rear), and may leverage one or more other camera(s) (e.g., a forward-facing camera) as a fourth surround view camera.

Cameras with a field of view that include portions of the environment to the rear of the vehicle 900 (e.g., rear-view cameras) may be used for park assistance, surround view, rear collision warnings, and creating and updating the occupancy grid. A wide variety of cameras may be used including, but not limited to, cameras that are also suitable as a front-facing camera(s) (e.g., long-range and/or mid-range camera(s) 998, stereo camera(s) 968), infrared camera(s) 972, etc.), as described herein.

Figure 9C:
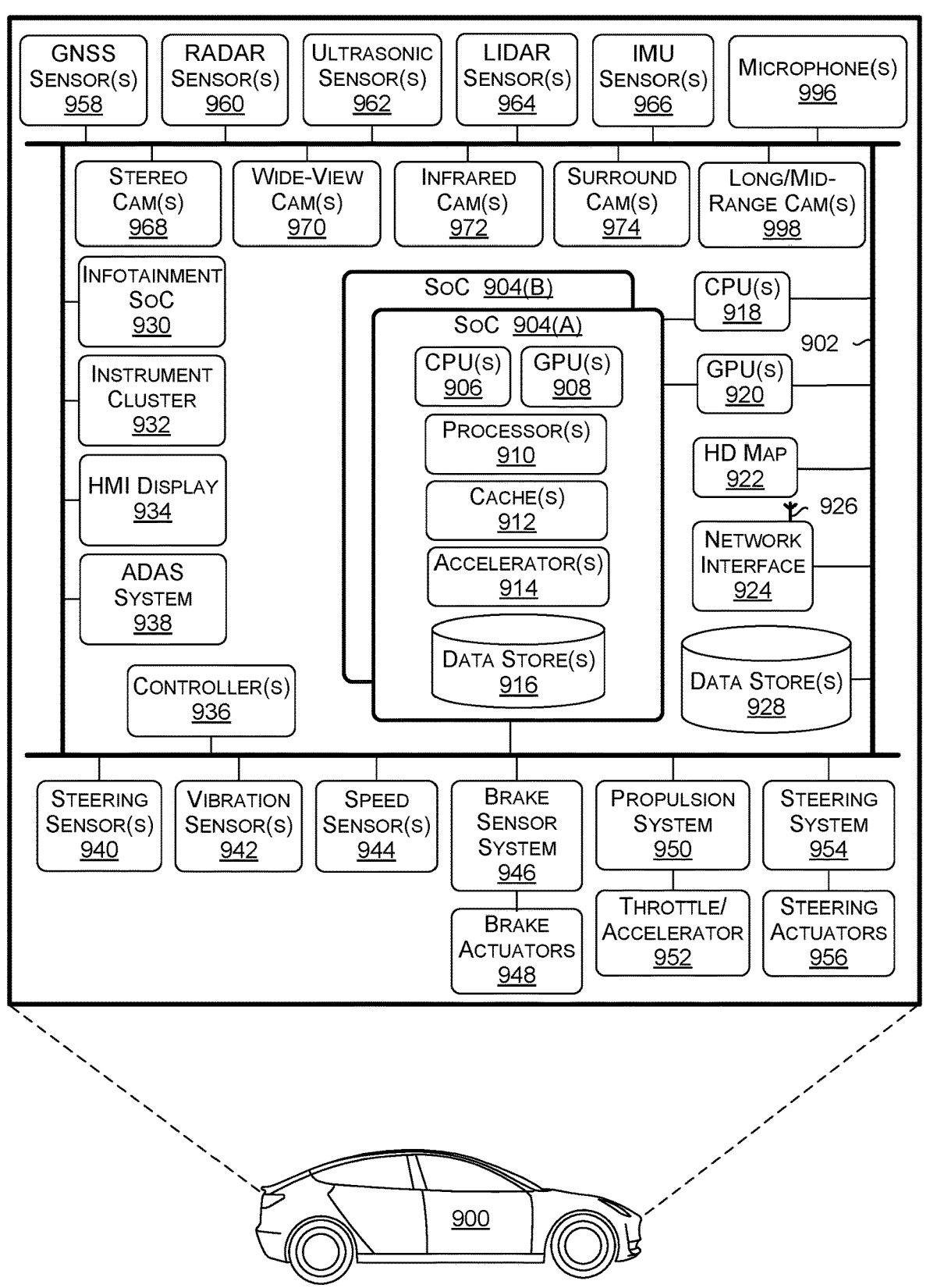
FIG. 9C is a block diagram of an example system architecture for the example autonomous vehicle of FIG. 9A, in accordance with some embodiments of the present disclosure.

FIG. 9C is a block diagram of an example system architecture for the example autonomous vehicle 900 of FIG. 9A, in accordance with some embodiments of the present disclosure. It should be understood that this and other arrangements described herein are set forth only as examples. Other arrangements and elements (e.g., machines, interfaces, functions, orders, groupings of functions, etc.) may be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by entities may be carried out by hardware, firmware, and/or software. For instance, various functions may be carried out by a processor executing instructions stored in memory.

Each of the components, features, and systems of the vehicle 900 in FIG. 9C are illustrated as being connected via bus 902. The bus 902 may include a Controller Area Network (CAN) data interface (alternatively referred to herein as a "CAN bus"). A CAN may be a network inside the vehicle 900 used to aid in control of various features and functionality of the vehicle 900, such as actuation of brakes, acceleration, braking, steering, windshield wipers, etc. A CAN bus may be configured to have dozens or even hundreds of nodes, each with its own unique identifier (e.g., a CAN ID). The CAN bus may be read to find steering wheel angle, ground speed, engine revolutions per minute (RPMs), button positions, and/or other vehicle status indicators. The CAN bus may be ASIL B compliant.

Although the bus 902 is described herein as being a CAN bus, this is not intended to be limiting. For example, in addition to, or alternatively from, the CAN bus, FlexRay and/or Ethernet may be used. Additionally, although a single line is used to represent the bus 902, this is not intended to be limiting. For example, there may be any number of busses 902, which may include one or more CAN busses, one or more FlexRay busses, one or more Ethernet busses, and/or one or more other types of busses using a different protocol. In some examples, two or more busses 902 may be used to perform different functions, and/or may be used for redundancy. For example, a first bus 902 may be used for collision avoidance functionality and a second bus 902 may be used for actuation control. In any example, each bus 902 may communicate with any of the components of the vehicle 900, and two or more busses 902 may communicate with the same components. In some examples, each SoC 904, each controller 936, and/or each computer within the vehicle may have access to the same input data (e.g., inputs from sensors of the vehicle 900), and may be connected to a common bus, such the CAN bus.

The vehicle 900 may include one or more controller(s) 936, such as those described herein with respect to FIG. 9A. The controller(s) 936 may be used for a variety of functions. The controller(s) 936 may be coupled to any of the various other components and systems of the vehicle 900, and may be used for control of the vehicle 900, artificial intelligence of the vehicle 900, infotainment for the vehicle 900, and/or the like.

The vehicle 900 may include a system(s) on a chip (SoC) 904. The SoC 904 may include CPU(s) 906, GPU(s) 908, processor(s) 910, cache(s) 912, accelerator(s) 914, data store(s) 916, and/or other components and features not illustrated. The SoC(s) 904 may be used to control the vehicle 900 in a variety of platforms and systems. For example, the SoC(s) 904 may be combined in a system (e.g., the system of the vehicle 900) with an HD map 922 which may obtain map refreshes and/or updates via a network interface 924 from one or more servers (e.g., server(s) 978 of FIG. 9D).

The CPU(s) 906 may include a CPU cluster or CPU complex (alternatively referred to herein as a "CCPLEX"). The CPU(s) 906 may include multiple cores and/or L2 caches. For example, in some embodiments, the CPU(s) 906 may include eight cores in a coherent multi-processor configuration. In some embodiments, the CPU(s) 906 may include four dual-core clusters where each cluster has a dedicated L2 cache (e.g., a 2 MB L2 cache). The CPU(s) 906 (e.g., the CCPLEX) may be configured to support simultaneous cluster operation enabling any combination of the clusters of the CPU(s) 906 to be active at any given time.

The CPU(s) 906 may implement power management capabilities that include one or more of the following features: individual hardware blocks may be clock-gated automatically when idle to save dynamic power; each core clock may be gated when the core is not actively executing instructions due to execution of WFI/WFE instructions; each core may be independently power-gated; each core cluster may be independently clock-gated when all cores are clock-gated or power-gated; and/or each core cluster may be independently power-gated when all cores are power-gated. The CPU(s) 906 may further implement an enhanced algorithm for managing power states, where allowed power states and expected wakeup times are specified, and the hardware/microcode determines the best power state to enter for the core, cluster, and CCPLEX. The processing cores may support simplified power state entry sequences in software with the work offloaded to microcode.

The GPU(s) 908 may include an integrated GPU (alternatively referred to herein as an "iGPU"). The GPU(s) 908 may be programmable and may be efficient for parallel workloads. The GPU(s) 908, in some examples, may use an enhanced tensor instruction set. The GPU(s) 908 may include one or more streaming microprocessors, where each streaming microprocessor may include an L1 cache (e.g., an L1 cache with at least 96 KB storage capacity), and two or more of the streaming microprocessors may share an L2 cache (e.g., an L2 cache with a 512 KB storage capacity). In some embodiments, the GPU(s) 908 may include at least eight streaming microprocessors. The GPU(s) 908 may use compute application programming interface(s) (API(s)). In addition, the GPU(s) 908 may use one or more parallel computing platforms and/or programming models (e.g., NVIDIA's CUDA).

The GPU(s) 908 may be power-optimized for best performance in automotive and embedded use cases. For example, the GPU(s) 908 may be fabricated on a Fin field-effect transistor (FinFET). However, this is not intended to be limiting and the GPU(s) 908 may be fabricated using other semiconductor manufacturing processes. Each streaming microprocessor may incorporate a number of mixed-precision processing cores partitioned into multiple blocks. For example, and without limitation, 64 PF32 cores and 32 PF64 cores may be partitioned into four processing blocks. In such an example, each processing block may be allocated 16 FP32 cores, 8 FP64 cores, 16 INT32 cores, two mixed-precision NVIDIA TENSOR COREs for deep learning matrix arithmetic, an L0 instruction cache, a warp scheduler, a dispatch unit, and/or a 64 KB register file. In addition, the streaming microprocessors may include independent parallel integer and floating-point data paths to provide for efficient execution of workloads with a mix of computation and addressing calculations. The streaming microprocessors may include independent thread scheduling capability to enable finer-grain synchronization and cooperation between parallel threads. The streaming microprocessors may include a combined L1 data cache and shared memory unit in order to improve performance while simplifying programming.

The GPU(s) 908 may include a high bandwidth memory (HBM) and/or a 16 GB HBM2 memory subsystem to provide, in some examples, about 900 GB/second peak memory bandwidth. In some examples, in addition to, or alternatively from, the HBM memory, a synchronous graphics random-access memory (SGRAM) may be used, such as a graphics double data rate type five synchronous random-access memory (GDDR5).

The GPU(s) 908 may include unified memory technology including access counters to allow for more accurate migration of memory pages to the processor that accesses them most frequently, thereby improving efficiency for memory ranges shared between processors. In some examples, address translation services (ATS) support may be used to allow the GPU(s) 908 to access the CPU(s) 906 page tables directly. In such examples, when the GPU(s) 908 memory management unit (MMU) experiences a miss, an address translation request may be transmitted to the CPU(s) 906. In response, the CPU(s) 906 may look in its page tables for the virtual-to-physical mapping for the address and transmits the translation back to the GPU(s) 908. As such, unified memory technology may allow a single unified virtual address space for memory of both the CPU(s) 906 and the GPU(s) 908, thereby simplifying the GPU(s) 908 programming and porting of applications to the GPU(s) 908.

In addition, the GPU(s) 908 may include an access counter that may keep track of the frequency of access of the GPU(s) 908 to memory of other processors. The access counter may help ensure that memory pages are moved to the physical memory of the processor that is accessing the pages most frequently.

The SoC(s) 904 may include any number of cache(s) 912, including those described herein. For example, the cache(s) 912 may include an L3 cache that is available to both the CPU(s) 906 and the GPU(s) 908 (e.g., that is connected both the CPU(s) 906 and the GPU(s) 908). The cache(s) 912 may include a write-back cache that may keep track of states of lines, such as by using a cache coherence protocol (e.g., MEI, MESI, MSI, etc.). The L3 cache may include 4 MB or more, depending on the embodiment, although smaller cache sizes may be used.

The SoC(s) 904 may include an arithmetic logic unit(s) (ALU(s)) which may be leveraged in performing processing with respect to any of the variety of tasks or operations of the vehicle 900—such as processing DNNs. In addition, the SoC(s) 904 may include a floating point unit(s) (FPU(s))— or other math coprocessor or numeric coprocessor types— for performing mathematical operations within the system. For example, the SoC(s) 104 may include one or more FPUs integrated as execution units within a CPU(s) 906 and/or GPU(s) 908.

The SoC(s) 904 may include one or more accelerators 914 (e.g., hardware accelerators, software accelerators, or a combination thereof). For example, the SoC(s) 904 may include a hardware acceleration cluster that may include optimized hardware accelerators and/or large on-chip memory. The large on-chip memory (e.g., 4 MB of SRAM), may enable the hardware acceleration cluster to accelerate neural networks and other calculations. The hardware acceleration cluster may be used to complement the GPU(s) 908 and to off-load some of the tasks of the GPU(s) 908 (e.g., to free up more cycles of the GPU(s) 908 for performing other tasks). As an example, the accelerator(s) 914 may be used for targeted workloads (e.g., perception, convolutional neural networks (CNNs), etc.) that are stable enough to be amenable to acceleration. The term "CNN," as used herein, may include all types of CNNs, including region-based or regional convolutional neural networks (RCNNs) and Fast RCNNs (e.g., as used for object detection).

The accelerator(s) 914 (e.g., the hardware acceleration cluster) may include a deep learning accelerator(s) (DLA). The DLA(s) may include one or more Tensor processing units (TPUs) that may be configured to provide an additional ten trillion operations per second for deep learning applications and inferencing. The TPUs may be accelerators configured to, and optimized for, performing image processing functions (e.g., for CNNs, RCNNs, etc.). The DLA(s) may further be optimized for a specific set of neural network types and floating point operations, as well as inferencing. The design of the DLA(s) may provide more performance per millimeter than a general-purpose GPU, and vastly exceeds the performance of a CPU. The TPU(s) may perform several functions, including a single-instance convolution function, supporting, for example, INT8, INT16, and FP16 data types for both features and weights, as well as post-processor functions.

The DLA(s) may quickly and efficiently execute neural networks, especially CNNs, on processed or unprocessed data for any of a variety of functions, including, for example and without limitation: a CNN for object identification and detection using data from camera sensors; a CNN for distance estimation using data from camera sensors; a CNN for emergency vehicle detection and identification and detection using data from microphones; a CNN for facial recognition and vehicle owner identification using data from camera sensors; and/or a CNN for security and/or safety related events.

The DLA(s) may perform any function of the GPU(s) 908, and by using an inference accelerator, for example, a designer may target either the DLA(s) or the GPU(s) 908 for any function. For example, the designer may focus processing of CNNs and floating point operations on the DLA(s) and leave other functions to the GPU(s) 908 and/or other accelerator(s) 914.

The accelerator(s) 914 (e.g., the hardware acceleration cluster) may include a programmable vision accelerator(s) (PVA), which may alternatively be referred to herein as a computer vision accelerator. The PVA(s) may be designed and configured to accelerate computer vision algorithms for the advanced driver assistance systems (ADAS), autonomous driving, and/or augmented reality (AR) and/or virtual reality (VR) applications. The PVA(s) may provide a balance between performance and flexibility. For example, each PVA(s) may include, for example and without limitation, any number of reduced instruction set computer (RISC) cores, direct memory access (DMA), and/or any number of vector processors.

The RISC cores may interact with image sensors (e.g., the image sensors of any of the cameras described herein), image signal processor(s), and/or the like. Each of the RISC cores may include any amount of memory. The RISC cores may use any of a number of protocols, depending on the embodiment. In some examples, the RISC cores may execute a real-time operating system (RTOS). The RISC cores may be implemented using one or more integrated circuit devices, application specific integrated circuits (ASICs), and/or memory devices. For example, the RISC cores may include an instruction cache and/or a tightly coupled RAM.

The DMA may enable components of the PVA(s) to access the system memory independently of the CPU(s) 906. The DMA may support any number of features used to provide optimization to the PVA including, but not limited to, supporting multi-dimensional addressing and/or circular addressing. In some examples, the DMA may support up to six or more dimensions of addressing, which may include block width, block height, block depth, horizontal block stepping, vertical block stepping, and/or depth stepping.

The vector processors may be programmable processors that may be designed to efficiently and flexibly execute programming for computer vision algorithms and provide signal processing capabilities. In some examples, the PVA may include a PVA core and two vector processing subsystem partitions. The PVA core may include a processor subsystem, DMA engine(s) (e.g., two DMA engines), and/or other peripherals. The vector processing subsystem may operate as the primary processing engine of the PVA, and may include a vector processing unit (VPU), an instruction cache, and/or vector memory (e.g., VMEM). A VPU core may include a digital signal processor such as, for example, a single instruction, multiple data (SIMD), very long instruction word (VLIW) digital signal processor. The combination of the SIMD and VLIW may enhance throughput and speed.

Each of the vector processors may include an instruction cache and may be coupled to dedicated memory. As a result, in some examples, each of the vector processors may be configured to execute independently of the other vector processors. In other examples, the vector processors that are included in a particular PVA may be configured to employ data parallelism. For example, in some embodiments, the plurality of vector processors included in a single PVA may execute the same computer vision algorithm, but on different regions of an image. In other examples, the vector processors included in a particular PVA may simultaneously execute different computer vision algorithms, on the same image, or even execute different algorithms on sequential images or portions of an image. Among other things, any number of PVAs may be included in the hardware acceleration cluster and any number of vector processors may be included in each of the PVAs. In addition, the PVA(s) may include additional error correcting code (ECC) memory, to enhance overall system safety.

The accelerator(s) 914 (e.g., the hardware acceleration cluster) may include a computer vision network on-chip and SRAM, for providing a high-bandwidth, low latency SRAM for the accelerator(s) 914. In some examples, the on-chip memory may include at least 4 MB SRAM, consisting of, for example and without limitation, eight field-configurable memory blocks, that may be accessible by both the PVA and the DLA. Each pair of memory blocks may include an advanced peripheral bus (APB) interface, configuration circuitry, a controller, and a multiplexer. Any type of memory may be used. The PVA and DLA may access the memory via a backbone that provides the PVA and DLA with high-speed access to memory. The backbone may include a computer vision network on-chip that interconnects the PVA and the DLA to the memory (e.g., using the APB).

The computer vision network on-chip may include an interface that determines, before transmission of any control signal/address/data, that both the PVA and the DLA provide ready and valid signals. Such an interface may provide for separate phases and separate channels for transmitting control signals/addresses/data, as well as burst-type communications for continuous data transfer. This type of interface may comply with ISO 26262 or IEC 61508 standards, although other standards and protocols may be used.

In some examples, the SoC(s) 904 may include a real-time ray-tracing hardware accelerator, such as described in U.S. patent application Ser. No. 16/101,232, filed on Aug. 10, 2018. The real-time ray-tracing hardware accelerator may be used to quickly and efficiently determine the positions and extents of objects (e.g., within a world model), to generate real-time visualization simulations, for RADAR signal interpretation, for sound propagation synthesis and/or analysis, for simulation of SONAR systems, for general wave propagation simulation, for comparison to LIDAR data for purposes of localization and/or other functions, and/or for other uses. In some embodiments, one or more tree traversal units (TTUs) may be used for executing one or more ray-tracing related operations.

The accelerator(s) 914 (e.g., the hardware accelerator cluster) have a wide array of uses for autonomous driving. The PVA may be a programmable vision accelerator that may be used for key processing stages in ADAS and autonomous vehicles. The PVA's capabilities are a good match for algorithmic domains needing predictable processing, at low power and low latency. In other words, the PVA performs well on semi-dense or dense regular computation, even on small data sets, which need predictable run-times with low latency and low power. Thus, in the context of platforms for autonomous vehicles, the PVAs are designed to run classic computer vision algorithms, as they are efficient at object detection and operating on integer math.

For example, according to one embodiment of the technology, the PVA is used to perform computer stereo vision. A semi-global matching-based algorithm may be used in some examples, although this is not intended to be limiting. Many applications for Level 3-5 autonomous driving require motion estimation/stereo matching on-the-fly (e.g., structure from motion, pedestrian recognition, lane detection, etc.). The PVA may perform computer stereo vision function on inputs from two monocular cameras.

In some examples, the PVA may be used to perform dense optical flow. According to process raw RADAR data (e.g., using a 4D Fast Fourier Transform) to provide Processed RADAR. In other examples, the PVA is used for time of flight depth processing, by processing raw time of flight data to provide processed time of flight data, for example.

The DLA may be used to run any type of network to enhance control and driving safety, including for example, a neural network that outputs a measure of confidence for each object detection. Such a confidence value may be interpreted as a probability, or as providing a relative "weight" of each detection compared to other detections. This confidence value enables the system to make further decisions regarding which detections should be considered as true positive detections rather than false positive detections. For example, the system may set a threshold value for the confidence and consider only the detections exceeding the threshold value as true positive detections. In an automatic emergency braking (AEB) system, false positive detections would cause the vehicle to automatically perform emergency braking, which is obviously undesirable. Therefore, only the most confident detections should be considered as triggers for AEB. The DLA may run a neural network for regressing the confidence value. The neural network may take as its input at least some subset of parameters, such as bounding box dimensions, ground plane estimate obtained (e.g. from another subsystem), inertial measurement unit (IMU) sensor 966 output that correlates with the vehicle 900 orientation, distance, 3D location estimates of the object obtained from the neural network and/or other sensors (e.g., LIDAR sensor(s) 964 or RADAR sensor(s) 960), among others.

The SoC(s) 904 may include data store(s) 916 (e.g., memory). The data store(s) 916 may be on-chip memory of the SoC(s) 904, which may store neural networks to be executed on the GPU and/or the DLA. In some examples, the data store(s) 916 may be large enough in capacity to store multiple instances of neural networks for redundancy and safety. The data store(s) 912 may comprise L2 or L3 cache(s) 912. Reference to the data store(s) 916 may include reference to the memory associated with the PVA, DLA, and/or other accelerator(s) 914, as described herein.

The SoC(s) 904 may include one or more processor(s) 910 (e.g., embedded processors). The processor(s) 910 may include a boot and power management processor that may be a dedicated processor and subsystem to handle boot power and management functions and related security enforcement. The boot and power management processor may be a part of the SoC(s) 904 boot sequence and may provide runtime power management services. The boot power and management processor may provide clock and voltage programming, assistance in system low power state transitions, management of SoC(s) 904 thermals and temperature sensors, and/or management of the SoC(s) 904 power states. Each temperature sensor may be implemented as a ring-oscillator whose output frequency is proportional to temperature, and the SoC(s) 904 may use the ring-oscillators to detect temperatures of the CPU(s) 906, GPU(s) 908, and/or accelerator(s) 914. If temperatures are determined to exceed a threshold, the boot and power management processor may enter a temperature fault routine and put the SoC(s) 904 into a lower power state and/or put the vehicle 900 into a chauffeur to safe stop mode (e.g., bring the vehicle 900 to a safe stop).

The processor(s) 910 may further include a set of embedded processors that may serve as an audio processing engine. The audio processing engine may be an audio subsystem that enables full hardware support for multi-channel audio over multiple interfaces, and a broad and flexible range of audio I/O interfaces. In some examples, the audio processing engine is a dedicated processor core with a digital signal processor with dedicated RAM.

The processor(s) 910 may further include an always on processor engine that may provide necessary hardware features to support low power sensor management and wake use cases. The always on processor engine may include a processor core, a tightly coupled RAM, supporting peripherals (e.g., timers and interrupt controllers), various I/O controller peripherals, and routing logic.

The processor(s) 910 may further include a safety cluster engine that includes a dedicated processor subsystem to handle safety management for automotive applications. The safety cluster engine may include two or more processor cores, a tightly coupled RAM, support peripherals (e.g., timers, an interrupt controller, etc.), and/or routing logic. In a safety mode, the two or more cores may operate in a lockstep mode and function as a single core with comparison logic to detect any differences between their operations.

The processor(s) 910 may further include a real-time camera engine that may include a dedicated processor subsystem for handling real-time camera management.

The processor(s) 910 may further include a high-dynamic range signal processor that may include an image signal processor that is a hardware engine that is part of the camera processing pipeline.

The processor(s) 910 may include a video image compositor that may be a processing block (e.g., implemented on a microprocessor) that implements video post-processing functions needed by a video playback application to produce the final image for the player window. The video image compositor may perform lens distortion correction on wide-view camera(s) 970, surround camera(s) 974, and/or on in-cabin monitoring camera sensors. In-cabin monitoring camera sensor is preferably monitored by a neural network running on another instance of the Advanced SoC, configured to identify in cabin events and respond accordingly. An in-cabin system may perform lip reading to activate cellular service and place a phone call, dictate emails, change the vehicle's destination, activate or change the vehicle's infotainment system and settings, or provide voice-activated web surfing. Certain functions are available to the driver only when the vehicle is operating in an autonomous mode, and are disabled otherwise.

The video image compositor may include enhanced temporal noise reduction for both spatial and temporal noise reduction. For example, where motion occurs in a video, the noise reduction weights spatial information appropriately, decreasing the weight of information provided by adjacent frames. Where an image or portion of an image does not include motion, the temporal noise reduction performed by the video image compositor may use information from the previous image to reduce noise in the current image.

The video image compositor may also be configured to perform stereo rectification on input stereo lens frames. The video image compositor may further be used for user interface composition when the operating system desktop is in use, and the GPU(s) 908 is not required to continuously render new surfaces. Even when the GPU(s) 908 is powered on and active doing 3D rendering, the video image compositor may be used to offload the GPU(s) 908 to improve performance and responsiveness.

The SoC(s) 904 may further include a mobile industry processor interface (MIPI) camera serial interface for receiving video and input from cameras, a high-speed interface, and/or a video input block that may be used for camera and related pixel input functions. The SoC(s) 904 may further include an input/output controller(s) that may be controlled by software and may be used for receiving I/O signals that are uncommitted to a specific role.

The SoC(s) 904 may further include a broad range of peripheral interfaces to enable communication with peripherals, audio codecs, power management, and/or other devices. The SoC(s) 904 may be used to process data from cameras (e.g., connected over Gigabit Multimedia Serial Link and Ethernet), sensors (e.g., LIDAR sensor(s) 964, RADAR sensor(s) 960, etc. that may be connected over Ethernet), data from bus 902 (e.g., speed of vehicle 900, steering wheel position, etc.), data from GNSS sensor(s) 958 (e.g., connected over Ethernet or CAN bus). The SoC(s) 904 may further include dedicated high-performance mass storage controllers that may include their own DMA engines, and that may be used to free the CPU(s) 906 from routine data management tasks.

The SoC(s) 904 may be an end-to-end platform with a flexible architecture that spans automation levels 3-5, thereby providing a comprehensive functional safety architecture that leverages and makes efficient use of computer vision and ADAS techniques for diversity and redundancy, provides a platform for a flexible, reliable driving software stack, along with deep learning tools. The SoC(s) 904 may be faster, more reliable, and even more energy-efficient and space-efficient than conventional systems. For example, the accelerator(s) 914, when combined with the CPU(s) 906, the GPU(s) 908, and the data store(s) 916, may provide for a fast, efficient platform for level 3-5 autonomous vehicles.

The technology thus provides capabilities and functionality that cannot be achieved by conventional systems. For example, computer vision algorithms may be executed on CPUs, which may be configured using high-level programming language, such as the C programming language, to execute a wide variety of processing algorithms across a wide variety of visual data. However, CPUs are oftentimes unable to meet the performance requirements of many computer vision applications, such as those related to execution time and power consumption, for example. In particular, many CPUs are unable to execute complex object detection algorithms in real-time, which is a requirement of in-vehicle ADAS applications, and a requirement for practical Level 3-5 autonomous vehicles.

In contrast to conventional systems, by providing a CPU complex, GPU complex, and a hardware acceleration cluster, the technology described herein allows for multiple neural networks to be performed simultaneously and/or sequentially, and for the results to be combined together to enable Level 3-5 autonomous driving functionality. For example, a CNN executing on the DLA or dGPU (e.g., the GPU(s) 920) may include a text and word recognition, allowing the supercomputer to read and understand traffic signs, including signs for which the neural network has not been specifically trained. The DLA may further include a neural network that is able to identify, interpret, and provides semantic understanding of the sign, and to pass that semantic understanding to the path planning modules running on the CPU Complex.

As another example, multiple neural networks may be run simultaneously, as is required for Level 3, 4, or 5 driving. For example, a warning sign consisting of "Caution: flashing lights indicate icy conditions," along with an electric light, may be independently or collectively interpreted by several neural networks. The sign itself may be identified as a traffic sign by a first deployed neural network (e.g., a neural network that has been trained), the text "Flashing lights indicate icy conditions" may be interpreted by a second deployed neural network, which informs the vehicle's path planning software (preferably executing on the CPU Complex) that when flashing lights are detected, icy conditions exist. The flashing light may be identified by operating a third deployed neural network over multiple frames, informing the vehicle's path-planning software of the presence (or absence) of flashing lights. All three neural networks may run simultaneously, such as within the DLA and/or on the GPU(s) 908.

In some examples, a CNN for facial recognition and vehicle owner identification may use data from camera sensors to identify the presence of an authorized driver and/or owner of the vehicle 900. The always on sensor processing engine may be used to unlock the vehicle when the owner approaches the driver door and turn on the lights, and, in security mode, to disable the vehicle when the owner leaves the vehicle. In this way, the SoC(s) 904 provide for security against theft and/or carjacking.

In another example, a CNN for emergency vehicle detection and identification may use data from microphones 996 to detect and identify emergency vehicle sirens. In contrast to conventional systems, that use general classifiers to detect sirens and manually extract features, the SoC(s) 904 use the CNN for classifying environmental and urban sounds, as well as classifying visual data. In a preferred embodiment, the CNN running on the DLA is trained to identify the relative closing speed of the emergency vehicle (e.g., by using the Doppler Effect). The CNN may also be trained to identify emergency vehicles specific to the local area in which the vehicle is operating, as identified by GNSS sensor(s) 958. Thus, for example, when operating in Europe the CNN will seek to detect European sirens, and when in the United States the CNN will seek to identify only North American sirens. Once an emergency vehicle is detected, a control program may be used to execute an emergency vehicle safety routine, slowing the vehicle, pulling over to the side of the road, parking the vehicle, and/or idling the vehicle, with the assistance of ultrasonic sensors 962, until the emergency vehicle(s) passes.

The vehicle may include a CPU(s) 918 (e.g., discrete CPU(s), or dCPU(s)), that may be coupled to the SoC(s) 904 via a high-speed interconnect (e.g., PCIe). The CPU(s) 918 may include an X86 processor, for example. The CPU(s) 918 may be used to perform any of a variety of functions, including arbitrating potentially inconsistent results between ADAS sensors and the SoC(s) 904, and/or monitoring the status and health of the controller(s) 936 and/or infotainment SoC 930, for example.

The vehicle 900 may include a GPU(s) 920 (e.g., discrete GPU(s), or dGPU(s)), that may be coupled to the SoC(s) 904 via a high-speed interconnect (e.g., NVIDIA's NVLINK). The GPU(s) 920 may provide additional artificial intelligence functionality, such as by executing redundant and/or different neural networks, and may be used to train and/or update neural networks based on input (e.g., sensor data) from sensors of the vehicle 900.

The vehicle 900 may further include the network interface 924 which may include one or more wireless antennas 926 (e.g., one or more wireless antennas for different communication protocols, such as a cellular antenna, a Bluetooth antenna, etc.). The network interface 924 may be used to enable wireless connectivity over the Internet with the cloud (e.g., with the server(s) 978 and/or other network devices), with other vehicles, and/or with computing devices (e.g., client devices of passengers). To communicate with other vehicles, a direct link may be established between the two vehicles and/or an indirect link may be established (e.g., across networks and over the Internet). Direct links may be provided using a vehicle-to-vehicle communication link. The vehicle-to-vehicle communication link may provide the vehicle 900 information about vehicles in proximity to the vehicle 900 (e.g., vehicles in front of, on the side of, and/or behind the vehicle 900). This functionality may be part of a cooperative adaptive cruise control functionality of the vehicle 900.

The network interface 924 may include a SoC that provides modulation and demodulation functionality and enables the controller(s) 936 to communicate over wireless networks. The network interface 924 may include a radio frequency front-end for up-conversion from baseband to radio frequency, and down conversion from radio frequency to baseband. The frequency conversions may be performed through well-known processes, and/or may be performed using super-heterodyne processes. In some examples, the radio frequency front end functionality may be provided by a separate chip. The network interface may include wireless functionality for communicating over LTE, WCDMA, UMTS, GSM, CDMA2000, Bluetooth, Bluetooth LE, Wi-Fi, Z-Wave, ZigBee, LoRaWAN, and/or other wireless protocols.

The vehicle 900 may further include data store(s) 928 which may include off-chip (e.g., off the SoC(s) 904) storage. The data store(s) 928 may include one or more storage elements including RAM, SRAM, DRAM, VRAM, Flash, hard disks, and/or other components and/or devices that may store at least one bit of data.

The vehicle 900 may further include GNSS sensor(s) 958. The GNSS sensor(s) 958 (e.g., GPS, assisted GPS sensors, differential GPS (DGPS), etc.), to assist in mapping, perception, occupancy grid generation, and/or path planning functions. Any number of GNSS sensor(s) 958 may be used, including, for example and without limitation, a GPS using a USB connector with an Ethernet to Serial (RS-232) bridge.

The vehicle 900 may further include RADAR sensor(s) 960. The RADAR sensor(s) 960 may be used by the vehicle 900 for long-range vehicle detection, even in darkness and/or severe weather conditions. RADAR functional safety levels may be ASIL B. The RADAR sensor(s) 960 may use the CAN and/or the bus 902 (e.g., to transmit data generated by the RADAR sensor(s) 960) for control and to access object tracking data, with access to Ethernet to access raw data in some examples. A wide variety of RADAR sensor types may be used. For example, and without limitation, the RADAR sensor(s) 960 may be suitable for front, rear, and side RADAR use. In some example, Pulse Doppler RADAR sensor(s) are used.

The RADAR sensor(s) 960 may include different configurations, such as long range with narrow field of view, short range with wide field of view, short range side coverage, etc. In some examples, long-range RADAR may be used for adaptive cruise control functionality. The long-range RADAR systems may provide a broad field of view realized by two or more independent scans, such as within a 250 m range. The RADAR sensor(s) 960 may help in distinguishing between static and moving objects, and may be used by ADAS systems for emergency brake assist and forward collision warning. Long-range RADAR sensors may include monostatic multimodal RADAR with multiple (e.g., six or more) fixed RADAR antennae and a high-speed CAN and FlexRay interface. In an example with six antennae, the central four antennae may create a focused beam pattern, designed to record the vehicle's 900 surroundings at higher speeds with minimal interference from traffic in adjacent lanes. The other two antennae may expand the field of view, making it possible to quickly detect vehicles entering or leaving the vehicle's 900 lane.

Mid-range RADAR systems may include, as an example, a range of up to 960 m (front) or 80 m (rear), and a field of view of up to 42 degrees (front) or 950 degrees (rear). Short-range RADAR systems may include, without limitation, RADAR sensors designed to be installed at both ends of the rear bumper. When installed at both ends of the rear bumper, such a RADAR sensor systems may create two beams that constantly monitor the blind spot in the rear and next to the vehicle.

Short-range RADAR systems may be used in an ADAS system for blind spot detection and/or lane change assist.

The vehicle 900 may further include ultrasonic sensor(s) 962. The ultrasonic sensor(s) 962, which may be positioned at the front, back, and/or the sides of the vehicle 900, may be used for park assist and/or to create and update an occupancy grid. A wide variety of ultrasonic sensor(s) 962 may be used, and different ultrasonic sensor(s) 962 may be used for different ranges of detection (e.g., 2.5 m, 4 m). The ultrasonic sensor(s) 962 may operate at functional safety levels of ASIL B.

The vehicle 900 may include LIDAR sensor(s) 964. The LIDAR sensor(s) 964 may be used for object and pedestrian detection, emergency braking, collision avoidance, and/or other functions. The LIDAR sensor(s) 964 may be func-tional safety level ASIL B. In some examples, the vehicle 900 may include multiple LIDAR sensors 964 (e.g., two, four, six, etc.) that may use Ethernet (e.g., to provide data to a Gigabit Ethernet switch).

In some examples, the LIDAR sensor(s) 964 may be capable of providing a list of objects and their distances for a 360-degree field of view. Commercially available LIDAR sensor(s) 964 may have an advertised range of approximately 900 m, with an accuracy of 2 cm-3 cm, and with support for a 900 Mbps Ethernet connection, for example. In some examples, one or more non-protruding LIDAR sensors 964 may be used. In such examples, the LIDAR sensor(s) 964 may be implemented as a small device that may be embedded into the front, rear, sides, and/or corners of the vehicle 900. The LIDAR sensor(s) 964, in such examples, may provide up to a 120-degree horizontal and 35-degree vertical field-of-view, with a 200 m range even for low-reflectivity objects. Front-mounted LIDAR sensor(s) 964 may be configured for a horizontal field of view between 45 degrees and 135 degrees.

In some examples, LIDAR technologies, such as 3D flash LIDAR, may also be used. 3D Flash LIDAR uses a flash of a laser as a transmission source, to illuminate vehicle surroundings up to approximately 200 m. A flash LIDAR unit includes a receptor, which records the laser pulse transit time and the reflected light on each pixel, which in turn corresponds to the range from the vehicle to the objects. Flash LIDAR may allow for highly accurate and distortion-free images of the surroundings to be generated with every laser flash. In some examples, four flash LIDAR sensors may be deployed, one at each side of the vehicle 900. Available 3D flash LIDAR systems include a solid-state 3D staring array LIDAR camera with no moving parts other than a fan (e.g., a non-scanning LIDAR device). The flash LIDAR device may use a 5 nanosecond class I (eye-safe) laser pulse per frame and may capture the reflected laser light in the form of 3D range point clouds and co-registered intensity data. By using flash LIDAR, and because flash LIDAR is a solid-state device with no moving parts, the LIDAR sensor(s) 964 may be less susceptible to motion blur, vibration, and/or shock.

The vehicle may further include IMU sensor(s) 966. The IMU sensor(s) 966 may be located at a center of the rear axle of the vehicle 900, in some examples. The IMU sensor(s) 966 may include, for example and without limitation, an accelerometer(s), a magnetometer(s), a gyroscope(s), a magnetic compass(es), and/or other sensor types. In some examples, such as in six-axis applications, the IMU sensor(s) 966 may include accelerometers and gyroscopes, while in nine-axis applications, the IMU sensor(s) 966 may include accelerometers, gyroscopes, and magnetometers.

In some embodiments, the IMU sensor(s) 966 may be implemented as a miniature, high performance GPS-Aided Inertial Navigation System (GPS/INS) that combines micro-electro-mechanical systems (MEMS) inertial sensors, a high-sensitivity GPS receiver, and advanced Kalman filter-ing algorithms to provide estimates of position, velocity, and attitude. As such, in some examples, the IMU sensor(s) 966 may enable the vehicle 900 to estimate heading without requiring input from a magnetic sensor by directly observing and correlating the changes in velocity from GPS to the IMU sensor(s) 966. In some examples, the IMU sensor(s) 966 and the GNSS sensor(s) 958 may be combined in a single integrated unit.

The vehicle may include microphone(s) 996 placed in and/or around the vehicle 900. The microphone(s) 996 may be used for emergency vehicle detection and identification, among other things.

The vehicle may further include any number of camera types, including stereo camera(s) 968, wide-view camera(s) 970, infrared camera(s) 972, surround camera(s) 974, long-range and/or mid-range camera(s) 998, and/or other camera types. The cameras may be used to capture image data around an entire periphery of the vehicle 900. The types of cameras used depends on the embodiments and requirements for the vehicle 900, and any combination of camera types may be used to provide the necessary coverage around the vehicle 900. In addition, the number of cameras may differ depending on the embodiment. For example, the vehicle may include six cameras, seven cameras, ten cameras, twelve cameras, and/or another number of cameras. The cameras may support, as an example and without limitation, Gigabit Multimedia Serial Link (GMSL) and/or Gigabit Ethernet. Each of the camera(s) is described with more detail herein with respect to FIG. 9A and FIG. 9B.

The vehicle 900 may further include vibration sensor(s) 942. The vibration sensor(s) 942 may measure vibrations of components of the vehicle, such as the axle(s). For example, changes in vibrations may indicate a change in road surfaces. In another example, when two or more vibration sensors 942 are used, the differences between the vibrations may be used to determine friction or slippage of the road surface (e.g., when the difference in vibration is between a power-driven axle and a freely rotating axle).

The vehicle 900 may include an ADAS system 938. The ADAS system 938 may include a SoC, in some examples. The ADAS system 938 may include autonomous/adaptive/automatic cruise control (ACC), cooperative adaptive cruise control (CACC), forward crash warning (FCW), automatic emergency braking (AEB), lane departure warnings (LDW), lane keep assist (LKA), blind spot warning (BSW), rear cross-traffic warning (RCTW), collision warning systems (CWS), lane centering (LC), and/or other features and functionality.

The ACC systems may use RADAR sensor(s) 960, LIDAR sensor(s) 964, and/or a camera(s). The ACC systems may include longitudinal ACC and/or lateral ACC. Longitudinal ACC monitors and controls the distance to the vehicle immediately ahead of the vehicle 900 and automatically adjust the vehicle speed to maintain a safe distance from vehicles ahead. Lateral ACC performs distance keeping, and advises the vehicle 900 to change lanes when necessary. Lateral ACC is related to other ADAS applications such as LCA and CWS.

CACC uses information from other vehicles that may be received via the network interface 924 and/or the wireless antenna(s) 926 from other vehicles via a wireless link, or indirectly, over a network connection (e.g., over the Internet). Direct links may be provided by a vehicle-to-vehicle (V2V) communication link, while indirect links may be infrastructure-to-vehicle (I2V) communication link. In general, the V2V communication concept provides information about the immediately preceding vehicles (e.g., vehicles immediately ahead of and in the same lane as the vehicle 900), while the I2V communication concept provides information about traffic further ahead. CACC systems may include either or both I2V and V2V information sources. Given the information of the vehicles ahead of the vehicle 900, CACC may be more reliable and it has potential to improve traffic flow smoothness and reduce congestion on the road.

FCW systems are designed to alert the driver to a hazard, so that the driver may take corrective action. FCW systems use a front-facing camera and/or RADAR sensor(s) 960, coupled to a dedicated processor, DSP, FPGA, and/or ASIC, that is electrically coupled to driver feedback, such as a display, speaker, and/or vibrating component. FCW systems may provide a warning, such as in the form of a sound, visual warning, vibration and/or a quick brake pulse.

AEB systems detect an impending forward collision with another vehicle or other object, and may automatically apply the brakes if the driver does not take corrective action within a specified time or distance parameter. AEB systems may use front-facing camera(s) and/or RADAR sensor(s) 960, coupled to a dedicated processor, DSP, FPGA, and/or ASIC. When the AEB system detects a hazard, it typically first alerts the driver to take corrective action to avoid the collision and, if the driver does not take corrective action, the AEB system may automatically apply the brakes in an effort to prevent, or at least mitigate, the impact of the predicted collision. AEB systems, may include techniques such as dynamic brake support and/or crash imminent braking.

LDW systems provide visual, audible, and/or tactile warnings, such as steering wheel or seat vibrations, to alert the driver when the vehicle 900 crosses lane markings. A LDW system does not activate when the driver indicates an intentional lane departure, by activating a turn signal. LDW systems may use front-side facing cameras, coupled to a dedicated processor, DSP, FPGA, and/or ASIC, that is electrically coupled to driver feedback, such as a display, speaker, and/or vibrating component.

LKA systems are a variation of LDW systems. LKA systems provide steering input or braking to correct the vehicle 900 if the vehicle 900 starts to exit the lane.

BSW systems detects and warn the driver of vehicles in an automobile's blind spot. BSW systems may provide a visual, audible, and/or tactile alert to indicate that merging or changing lanes is unsafe. The system may provide an additional warning when the driver uses a turn signal. BSW systems may use rear-side facing camera(s) and/or RADAR sensor(s) 960, coupled to a dedicated processor, DSP, FPGA, and/or ASIC, that is electrically coupled to driver feedback, such as a display, speaker, and/or vibrating component.

RCTW systems may provide visual, audible, and/or tactile notification when an object is detected outside the rear-camera range when the vehicle 900 is backing up. Some RCTW systems include AEB to ensure that the vehicle brakes are applied to avoid a crash. RCTW systems may use one or more rear-facing RADAR sensor(s) 960, coupled to a dedicated processor, DSP, FPGA, and/or ASIC, that is electrically coupled to driver feedback, such as a display, speaker, and/or vibrating component.

Conventional ADAS systems may be prone to false positive results which may be annoying and distracting to a driver, but typically are not catastrophic, because the ADAS systems alert the driver and allow the driver to decide whether a safety condition truly exists and act accordingly. However, in an autonomous vehicle 900, the vehicle 900 itself must, in the case of conflicting results, decide whether to heed the result from a primary computer or a secondary computer (e.g., a first controller 936 or a second controller 936). For example, in some embodiments, the ADAS system 938 may be a backup and/or secondary computer for providing perception information to a backup computer rationality module. The backup computer rationality monitor may run a redundant diverse software on hardware components to detect faults in perception and dynamic driving tasks. Outputs from the ADAS system 938 may be provided to a supervisory MCU. If outputs from the primary computer and the secondary computer conflict, the supervisory MCU must determine how to reconcile the conflict to ensure safe operation.

In some examples, the primary computer may be configured to provide the supervisory MCU with a confidence score, indicating the primary computer's confidence in the chosen result. If the confidence score exceeds a threshold, the supervisory MCU may follow the primary computer's direction, regardless of whether the secondary computer provides a conflicting or inconsistent result. Where the confidence score does not meet the threshold, and where primary and secondary computer indicate different results (e.g., the conflict), the supervisory MCU may arbitrate between the computers to determine the appropriate outcome.

The supervisory MCU may be configured to run a neural network(s) that is trained and configured to determine, based on outputs from the primary computer and the secondary computer, conditions under which the secondary computer provides false alarms. Thus, the neural network(s) in the supervisory MCU may learn when the secondary computer's output may be trusted, and when it cannot. For example, when the secondary computer is a RADAR-based FCW system, a neural network(s) in the supervisory MCU may learn when the FCW system is identifying metallic objects that are not, in fact, hazards, such as a drainage grate or manhole cover that triggers an alarm. Similarly, when the secondary computer is a camera-based LDW system, a neural network in the supervisory MCU may learn to override the LDW when bicyclists or pedestrians are present and a lane departure is, in fact, the safest maneuver. In embodiments that include a neural network(s) running on the supervisory MCU, the supervisory MCU may include at least one of a DLA or GPU suitable for running the neural network(s) with associated memory. In preferred embodiments, the supervisory MCU may comprise and/or be included as a component of the SoC(s) 904.

In other examples, ADAS system 938 may include a secondary computer that performs ADAS functionality using traditional rules of computer vision. As such, the secondary computer may use classic computer vision rules (if-then), and the presence of a neural network(s) in the supervisory MCU may improve reliability, safety and performance. For example, the diverse implementation and intentional non-identity makes the overall system more fault-tolerant, especially to faults caused by software (or software-hardware interface) functionality. For example, if there is a software bug or error in the software running on the primary computer, and the non-identical software code running on the secondary computer provides the same overall result, the supervisory MCU may have greater confidence that the overall result is correct, and the bug in software or hardware on primary computer is not causing material error.

In some examples, the output of the ADAS system 938 may be fed into the primary computer's perception block and/or the primary computer's dynamic driving task block. For example, if the ADAS system 938 indicates a forward crash warning due to an object immediately ahead, the perception block may use this information when identifying objects. In other examples, the secondary computer may have its own neural network which is trained and thus reduces the risk of false positives, as described herein.

The vehicle 900 may further include the infotainment SoC 930 (e.g., an in-vehicle infotainment system (IVI)).

Although illustrated and described as a SoC, the infotainment system may not be a SoC, and may include two or more discrete components. The infotainment SoC 930 may include a combination of hardware and software that may be used to provide audio (e.g., music, a personal digital assistant, navigational instructions, news, radio, etc.), video (e.g., TV, movies, streaming, etc.), phone (e.g., hands-free calling), network connectivity (e.g., LTE, Wi-Fi, etc.), and/or information services (e.g., navigation systems, rear-parking assistance, a radio data system, vehicle related information such as fuel level, total distance covered, brake fuel level, oil level, door open/close, air filter information, etc.) to the vehicle 900. For example, the infotainment SoC 930 may radios, disk players, navigation systems, video players, USB and Bluetooth connectivity, carputers, in-car entertainment, Wi-Fi, steering wheel audio controls, hands free voice control, a heads-up display (HUD), an HMI display 934, a telematics device, a control panel (e.g., for controlling and/or interacting with various components, features, and/or systems), and/or other components. The infotainment SoC 930 may further be used to provide information (e.g., visual and/or audible) to a user(s) of the vehicle, such as information from the ADAS system 938, autonomous driving information such as planned vehicle maneuvers, trajectories, surrounding environment information (e.g., intersection information, vehicle information, road information, etc.), and/or other information.

The infotainment SoC 930 may include GPU functionality. The infotainment SoC 930 may communicate over the bus 902 (e.g., CAN bus, Ethernet, etc.) with other devices, systems, and/or components of the vehicle 900. In some examples, the infotainment SoC 930 may be coupled to a supervisory MCU such that the GPU of the infotainment system may perform some self-driving functions in the event that the primary controller(s) 936 (e.g., the primary and/or backup computers of the vehicle 900) fail. In such an example, the infotainment SoC 930 may put the vehicle 900 into a chauffeur to safe stop mode, as described herein.

The vehicle 900 may further include an instrument cluster 932 (e.g., a digital dash, an electronic instrument cluster, a digital instrument panel, etc.). The instrument cluster 932 may include a controller and/or supercomputer (e.g., a discrete controller or supercomputer). The instrument cluster 932 may include a set of instrumentation such as a speedometer, fuel level, oil pressure, tachometer, odometer, turn indicators, gearshift position indicator, seat belt warning light(s), parking-brake warning light(s), engine-malfunction light(s), airbag (SRS) system information, lighting controls, safety system controls, navigation information, etc. In some examples, information may be displayed and/or shared among the infotainment SoC 930 and the instrument cluster 932. In other words, the instrument cluster 932 may be included as part of the infotainment SoC 930, or vice versa.

Figure 9D:
FIG. 9D is a system diagram for communication between cloud-based server(s) and the example autonomous vehicle of FIG. 9A, in accordance with some embodiments of the present disclosure.

FIG. 9D is a system diagram for communication between cloud-based server(s) and the example autonomous vehicle 900 of FIG. 9A, in accordance with some embodiments of the present disclosure. The system 976 may include server(s) 978, network(s) 990, and vehicles, including the vehicle 900. The server(s) 978 may include a plurality of GPUs 984(A)-984(H) (collectively referred to herein as GPUs 984), PCIe switches 982(A)-982(H) (collectively referred to herein as PCIe switches 982), and/or CPUs 980(A)-980(B) (collectively referred to herein as CPUs 980). The GPUs 984, the CPUs 980, and the PCIe switches may be interconnected with high-speed interconnects such as, for example and without limitation, NVLink interfaces 988 developed by NVIDIA and/or PCIe connections 986. In some examples, the GPUs 984 are connected via NVLink and/or NVSwitch SoC and the GPUs 984 and the PCIe switches 982 are connected via PCIe interconnects. Although eight GPUs 984, two CPUs 980, and two PCIe switches are illustrated, this is not intended to be limiting. Depending on the embodiment, each of the server(s) 978 may include any number of GPUs 984, CPUs 980, and/or PCIe switches. For example, the server(s) 978 may each include eight, sixteen, thirty-two, and/or more GPUs 984.

The server(s) 978 may receive, over the network(s) 990 and from the vehicles, image data representative of images showing unexpected or changed road conditions, such as recently commenced road-work. The server(s) 978 may transmit, over the network(s) 990 and to the vehicles, neural networks 992, updated neural networks 992, and/or map information 994, including information regarding traffic and road conditions. The updates to the map information 994 may include updates for the HD map 922, such as information regarding construction sites, potholes, detours, flooding, and/or other obstructions. In some examples, the neural networks 992, the updated neural networks 992, and/or the map information 994 may have resulted from new training and/or experiences represented in data received from any number of vehicles in the environment, and/or based on training performed at a datacenter (e.g., using the server(s) 978 and/or other servers).

The server(s) 978 may be used to train machine learning models (e.g., neural networks) based on training data. The training data may be generated by the vehicles, and/or may be generated in a simulation (e.g., using a game engine). In some examples, the training data is tagged (e.g., where the neural network benefits from supervised learning) and/or undergoes other pre-processing, while in other examples the training data is not tagged and/or pre-processed (e.g., where the neural network does not require supervised learning). Training may be executed according to any one or more classes of machine learning techniques, including, without limitation, classes such as: supervised training, semi-supervised training, unsupervised training, self-learning, reinforcement learning, federated learning, transfer learning, feature learning (including principal component and cluster analyses), multi-linear subspace learning, manifold learning, representation learning (including spare dictionary learning), rule-based machine learning, anomaly detection, and any variants or combinations therefor. Once the machine learning models are trained, the machine learning models may be used by the vehicles (e.g., transmitted to the vehicles over the network(s) 990, and/or the machine learning models may be used by the server(s) 978 to remotely monitor the vehicles.

In some examples, the server(s) 978 may receive data from the vehicles and apply the data to up-to-date real-time neural networks for real-time intelligent inferencing. The server(s) 978 may include deep-learning supercomputers and/or dedicated AI computers powered by GPU(s) 984, such as a DGX and DGX Station machines developed by NVIDIA. However, in some examples, the server(s) 978 may include deep learning infrastructure that use only CPU-powered datacenters.

The deep-learning infrastructure of the server(s) 978 may be capable of fast, real-time inferencing, and may use that capability to evaluate and verify the health of the processors, software, and/or associated hardware in the vehicle 900. For example, the deep-learning infrastructure may receive periodic updates from the vehicle 900, such as a sequence of images and/or objects that the vehicle 900 has located in that sequence of images (e.g., via computer vision and/or other machine learning object classification techniques). The deep-learning infrastructure may run its own neural network to identify the objects and compare them with the objects identified by the vehicle 900 and, if the results do not match and the infrastructure concludes that the AI in the vehicle 900 is malfunctioning, the server(s) 978 may transmit a signal to the vehicle 900 instructing a fail-safe computer of the vehicle 900 to assume control, notify the passengers, and complete a safe parking maneuver.

For inferencing, the server(s) 978 may include the GPU(s) 984 and one or more programmable inference accelerators (e.g., NVIDIA's TensorRT). The combination of GPU-powered servers and inference acceleration may make real-time responsiveness possible. In other examples, such as where performance is less critical, servers powered by CPUs, FPGAs, and other processors may be used for inferencing.

Example Computing Device

Figure 10:
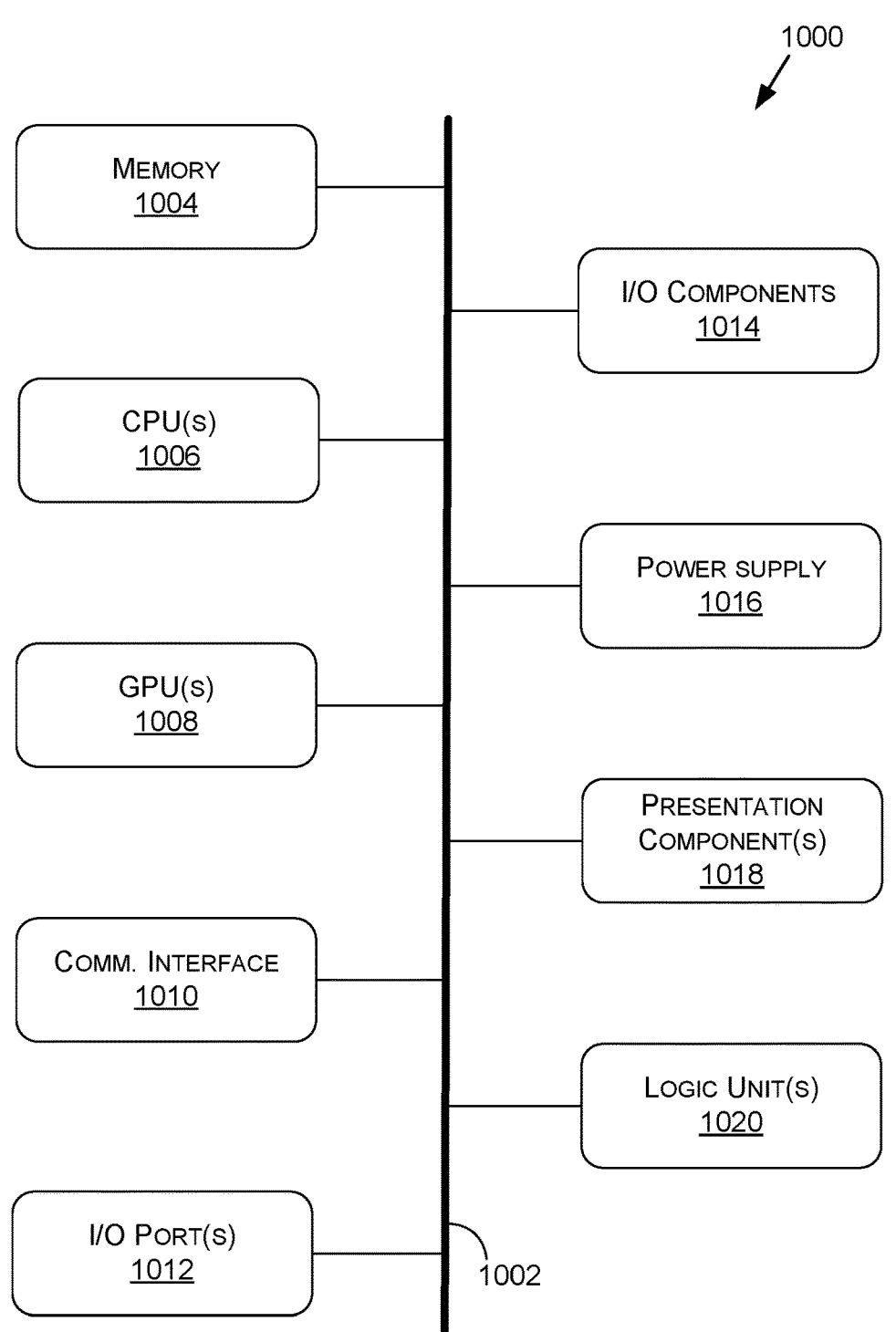
FIG. 10 is a block diagram of an example computing device suitable for use in implementing some embodiments of the present disclosure.

FIG. 10 is a block diagram of an example computing device(s) 1000 suitable for use in implementing some embodiments of the present disclosure. Computing device 1000 may include an interconnect system 1002 that directly or indirectly couples the following devices: memory 1004, one or more central processing units (CPUs) 1006, one or more graphics processing units (GPUs) 1008, a communication interface 1010, input/output (I/O) ports 1012, input/output components 1014, a power supply 1016, one or more presentation components 1018 (e.g., display(s)), and one or more logic units 1020. In at least one embodiment, the computing device(s) 1000 may comprise one or more virtual machines (VMs), and/or any of the components thereof may comprise virtual components (e.g., virtual hardware components). For non-limiting examples, one or more of the GPUs 1008 may comprise one or more vGPUs, one or more of the CPUs 1006 may comprise one or more vCPUs, and/or one or more of the logic units 1020 may comprise one or more virtual logic units. As such, a computing device(s) 1000 may include discrete components (e.g., a full GPU dedicated to the computing device 1000), virtual components (e.g., a portion of a GPU dedicated to the computing device 1000), or a combination thereof.

Although the various blocks of FIG. 10 are shown as connected via the interconnect system 1002 with lines, this is not intended to be limiting and is for clarity only. For example, in some embodiments, a presentation component 1018, such as a display device, may be considered an I/O component 1014 (e.g., if the display is a touch screen). As another example, the CPUs 1006 and/or GPUs 1008 may include memory (e.g., the memory 1004 may be representative of a storage device in addition to the memory of the GPUs 1008, the CPUs 1006, and/or other components). In other words, the computing device of FIG. 10 is merely illustrative. Distinction is not made between such categories as "workstation," "server," "laptop," "desktop," "tablet," "client device," "mobile device," "hand-held device," "game console," "electronic control unit (ECU)," "virtual reality system," and/or other device or system types, as all are contemplated within the scope of the computing device of FIG. 10.

The interconnect system 1002 may represent one or more links or busses, such as an address bus, a data bus, a control bus, or a combination thereof. The interconnect system 1002 may include one or more bus or link types, such as an industry standard architecture (ISA) bus, an extended industry standard architecture (EISA) bus, a video electronics standards association (VESA) bus, a peripheral component interconnect (PCI) bus, a peripheral component interconnect express (PCIe) bus, and/or another type of bus or link. In some embodiments, there are direct connections between components. As an example, the CPU 1006 may be directly connected to the memory 1004. Further, the CPU 1006 may be directly connected to the GPU 1008. Where there is direct, or point-to-point connection between components, the interconnect system 1002 may include a PCIe link to carry out the connection. In these examples, a PCI bus need not be included in the computing device 1000.

The memory 1004 may include any of a variety of computer-readable media. The computer-readable media may be any available media that may be accessed by the computing device 1000. The computer-readable media may include both volatile and nonvolatile media, and removable and non-removable media. By way of example, and not limitation, the computer-readable media may comprise computer-storage media and communication media.

The computer-storage media may include both volatile and nonvolatile media and/or removable and non-removable media implemented in any method or technology for storage of information such as computer-readable instructions, data structures, program modules, and/or other data types. For example, the memory 1004 may store computer-readable instructions (e.g., that represent a program(s) and/or a program element(s), such as an operating system. Computer-storage media may include, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which may be used to store the desired information and which may be accessed by computing device 1000. As used herein, computer storage media does not comprise signals per se.

The computer storage media may embody computer-readable instructions, data structures, program modules, and/or other data types in a modulated data signal such as a carrier wave or other transport mechanism and includes any information delivery media. The term "modulated data signal" may refer to a signal that has one or more of its characteristics set or changed in such a manner as to encode information in the signal. By way of example, and not limitation, the computer storage media may include wired media such as a wired network or direct-wired connection, and wireless media such as acoustic, RF, infrared and other wireless media. Combinations of any of the above should also be included within the scope of computer-readable media.

The CPU(s) 1006 may be configured to execute at least some of the computer-readable instructions to control one or more components of the computing device 1000 to perform one or more of the methods and/or processes described herein. The CPU(s) 1006 may each include one or more cores (e.g., one, two, four, eight, twenty-eight, seventy-two, etc.) that are capable of handling a multitude of software threads simultaneously. The CPU(s) 1006 may include any type of processor, and may include different types of processors depending on the type of computing device 1000 implemented (e.g., processors with fewer cores for mobile devices and processors with more cores for servers). For example, depending on the type of computing device 1000, the processor may be an Advanced RISC Machines (ARM) processor implemented using Reduced Instruction Set Computing (RISC) or an x86 processor implemented using Complex Instruction Set Computing (CISC). The computing device 1000 may include one or more CPUs 1006 in addition to one or more microprocessors or supplementary co-processors, such as math co-processors.

In addition to or alternatively from the CPU(s) 1006, the GPU(s) 1008 may be configured to execute at least some of the computer-readable instructions to control one or more components of the computing device 1000 to perform one or more of the methods and/or processes described herein. One or more of the GPU(s) 1008 may be an integrated GPU (e.g., with one or more of the CPU(s) 1006 and/or one or more of the GPU(s) 1008 may be a discrete GPU. In embodiments, one or more of the GPU(s) 1008 may be a coprocessor of one or more of the CPU(s) 1006. The GPU(s) 1008 may be used by the computing device 1000 to render graphics (e.g., 3D graphics) or perform general purpose computations. For example, the GPU(s) 1008 may be used for General-Purpose computing on GPUs (GPGPU). The GPU(s) 1008 may include hundreds or thousands of cores that are capable of handling hundreds or thousands of software threads simultaneously. The GPU(s) 1008 may generate pixel data for output images in response to rendering commands (e.g., rendering commands from the CPU(s) 1006 received via a host interface). The GPU(s) 1008 may include graphics memory, such as display memory, for storing pixel data or any other suitable data, such as GPGPU data. The display memory may be included as part of the memory 1004. The GPU(s) 1008 may include two or more GPUs operating in parallel (e.g., via a link). The link may directly connect the GPUs (e.g., using NVLINK) or may connect the GPUs through a switch (e.g., using NVSwitch). When combined together, each GPU 1008 may generate pixel data or GPGPU data for different portions of an output or for different outputs (e.g., a first GPU for a first image and a second GPU for a second image). Each GPU may include its own memory, or may share memory with other GPUs.

In addition to or alternatively from the CPU(s) 1006 and/or the GPU(s) 1008, the logic unit(s) 1020 may be configured to execute at least some of the computer-readable instructions to control one or more components of the computing device 1000 to perform one or more of the methods and/or processes described herein. In embodiments, the CPU(s) 1006, the GPU(s) 1008, and/or the logic unit(s) 1020 may discretely or jointly perform any combination of the methods, processes and/or portions thereof. One or more of the logic units 1020 may be part of and/or integrated in one or more of the CPU(s) 1006 and/or the GPU(s) 1008 and/or one or more of the logic units 1020 may be discrete components or otherwise external to the CPU(s) 1006 and/or the GPU(s) 1008. In embodiments, one or more of the logic units 1020 may be a coprocessor of one or more of the CPU(s) 1006 and/or one or more of the GPU(s) 1008.

Examples of the logic unit(s) 1020 include one or more processing cores and/or components thereof, such as Data Processing Units (DPUs), Tensor Cores (TCs), Tensor Processing Units (TPUs), Pixel Visual Cores (PVCs), Vision Processing Units (VPUs), Graphics Processing Clusters (GPCs), Texture Processing Clusters (TPCs), Streaming Multiprocessors (SMs), Tree Traversal Units (TTUs), Artificial Intelligence Accelerators (AIAs), Deep Learning Accelerators (DLAs), Arithmetic-Logic Units (ALUs), Application-Specific Integrated Circuits (ASICs), Floating Point Units (FPUs), input/output (I/O) elements, peripheral component interconnect (PCI) or peripheral component interconnect express (PCIe) elements, and/or the like.

The communication interface 1010 may include one or more receivers, transmitters, and/or transceivers that enable the computing device 1000 to communicate with other computing devices via an electronic communication network, included wired and/or wireless communications. The communication interface 1010 may include components and functionality to enable communication over any of a number of different networks, such as wireless networks (e.g., Wi-Fi, Z-Wave, Bluetooth, Bluetooth LE, ZigBee, etc.), wired networks (e.g., communicating over Ethernet or InfiniBand), low-power wide-area networks (e.g., LoRaWAN, SigFox, etc.), and/or the Internet. In one or more embodiments, logic unit(s) 1020 and/or communication interface 1010 may include one or more data processing units (DPUs) to transmit data received over a network and/or through interconnect system 1002 directly to (e.g., a memory of) one or more GPU(s) 1008.

The I/O ports 1012 may enable the computing device 1000 to be logically coupled to other devices including the I/O components 1014, the presentation component(s) 1018, and/or other components, some of which may be built in to (e.g., integrated in) the computing device 1000. Illustrative I/O components 1014 include a microphone, mouse, keyboard, joystick, game pad, game controller, satellite dish, scanner, printer, wireless device, etc. The I/O components 1014 may provide a natural user interface (NUI) that processes air gestures, voice, or other physiological inputs generated by a user. In some instances, inputs may be transmitted to an appropriate network element for further processing. An NUI may implement any combination of speech recognition, stylus recognition, facial recognition, biometric recognition, gesture recognition both on screen and adjacent to the screen, air gestures, head and eye tracking, and touch recognition (as described in more detail below) associated with a display of the computing device 1000. The computing device 1000 may be include depth cameras, such as stereoscopic camera systems, infrared camera systems, RGB camera systems, touchscreen technology, and combinations of these, for gesture detection and recognition. Additionally, the computing device 1000 may include accelerometers or gyroscopes (e.g., as part of an inertia measurement unit (IMU)) that enable detection of motion. In some examples, the output of the accelerometers or gyroscopes may be used by the computing device 1000 to render immersive augmented reality or virtual reality.

The power supply 1016 may include a hard-wired power supply, a battery power supply, or a combination thereof. The power supply 1016 may provide power to the computing device 1000 to enable the components of the computing device 1000 to operate.

The presentation component(s) 1018 may include a display (e.g., a monitor, a touch screen, a television screen, a heads-up-display (HUD), other display types, or a combination thereof), speakers, and/or other presentation components. The presentation component(s) 1018 may receive data from other components (e.g., the GPU(s) 1008, the CPU(s) 1006, DPUs, etc.), and output the data (e.g., as an image, video, sound, etc.).

Example Data Center

Figure 11:
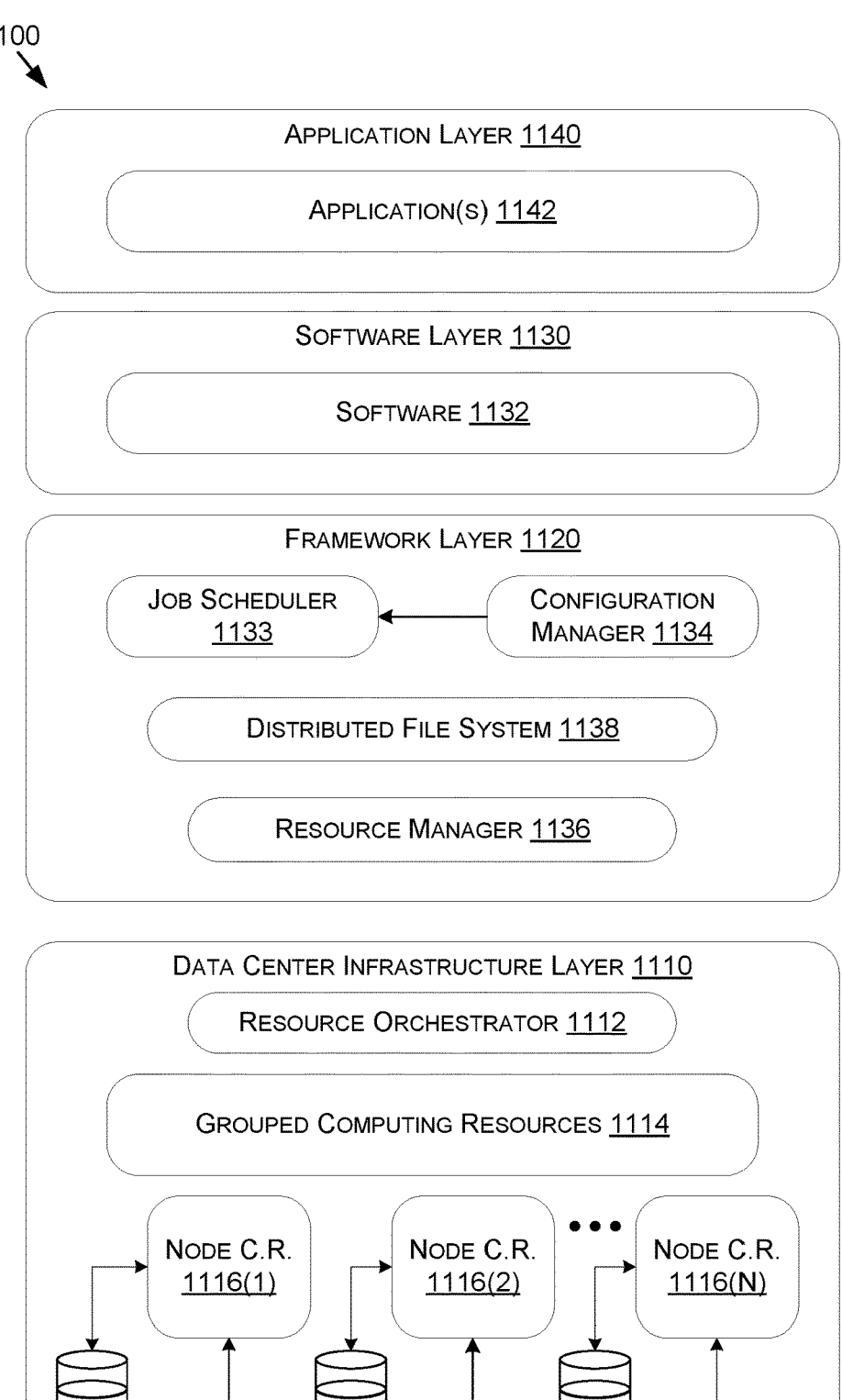
FIG. 11 is a block diagram of an example data center suitable for use in implementing some embodiments of the present disclosure.

FIG. 11 illustrates an example data center 1100 that may be used in at least one embodiments of the present disclosure. The data center 1100 may include a data center infrastructure layer 1110, a framework layer 1120, a software layer 1130, and/or an application layer 1140.

As shown in FIG. 11, the data center infrastructure layer 1110 may include a resource orchestrator 1112, grouped computing resources 1114, and node computing resources ("node C.R.s") 1116(1)-1116(N), where "N" represents any whole, positive integer. In at least one embodiment, node C.R.s 1116(1)-1116(N) may include, but are not limited to, any number of central processing units (CPUs) or other processors (including DPUs, accelerators, field programmable gate arrays (FPGAs), graphics processors or graphics processing units (GPUs), etc.), memory devices (e.g., dynamic read-only memory), storage devices (e.g., solid state or disk drives), network input/output (NW I/O) devices, network switches, virtual machines (VMs), power modules, and/or cooling modules, etc. In some embodiments, one or more node C.R.s from among node C.R.s 1116(1)-1116(N) may correspond to a server having one or more of the above-mentioned computing resources. In addition, in some embodiments, the node C.R.s 1116(1)-11161 (N) may include one or more virtual components, such as vGPUs, vCPUs, and/or the like, and/or one or more of the node C.R.s 1116(1)-1116(N) may correspond to a virtual machine (VM).

In at least one embodiment, grouped computing resources 1114 may include separate groupings of node C.R.s 1116 housed within one or more racks (not shown), or many racks housed in data centers at various geographical locations (also not shown). Separate groupings of node C.R.s 1116 within grouped computing resources 1114 may include grouped compute, network, memory or storage resources that may be configured or allocated to support one or more workloads. In at least one embodiment, several node C.R.s 1116 including CPUs, GPUs, DPUs, and/or other processors may be grouped within one or more racks to provide compute resources to support one or more workloads. The one or more racks may also include any number of power modules, cooling modules, and/or network switches, in any combination.

The resource orchestrator 1112 may configure or otherwise control one or more node C.R.s 1116(1)-1116(N) and/or grouped computing resources 1114. In at least one embodiment, resource orchestrator 1112 may include a software design infrastructure (SDI) management entity for the data center 1100. The resource orchestrator 1112 may include hardware, software, or some combination thereof.

In at least one embodiment, as shown in FIG. 11, framework layer 1120 may include a job scheduler 1133, a configuration manager 1134, a resource manager 1136, and/or a distributed file system 1138. The framework layer 1120 may include a framework to support software 1132 of software layer 1130 and/or one or more application(s) 1142 of application layer 1140. The software 1132 or application (s) 1142 may respectively include web-based service software or applications, such as those provided by Amazon Web Services, Google Cloud and Microsoft Azure. The framework layer 1120 may be, but is not limited to, a type of free and open-source software web application framework such as Apache Spark™ (hereinafter "Spark") that may utilize distributed file system 1138 for large-scale data processing (e.g., "big data"). In at least one embodiment, job scheduler 1133 may include a Spark driver to facilitate scheduling of workloads supported by various layers of data center 1100. The configuration manager 1134 may be capable of configuring different layers such as software layer 1130 and framework layer 1120 including Spark and distributed file system 1138 for supporting large-scale data processing. The resource manager 1136 may be capable of managing clustered or grouped computing resources mapped to or allocated for support of distributed file system 1138 and job scheduler 1133. In at least one embodiment, clustered or grouped computing resources may include grouped computing resource 1114 at data center infrastructure layer 1110. The resource manager 1136 may coordinate with resource orchestrator 1112 to manage these mapped or allocated computing resources.

In at least one embodiment, software 1132 included in software layer 1130 may include software used by at least portions of node C.R.s 1116(1)-1116(N), grouped computing resources 1114, and/or distributed file system 1138 of framework layer 1120. One or more types of software may include, but are not limited to, Internet web page search software, e-mail virus scan software, database software, and streaming video content software.

In at least one embodiment, application(s) 1142 included in application layer 1140 may include one or more types of applications used by at least portions of node C.R.s 1116 (1)-1116(N), grouped computing resources 1114, and/or distributed file system 1138 of framework layer 1120. One or more types of applications may include, but are not limited to, any number of a genomics application, a cognitive compute, and a machine learning application, including training or inferencing software, machine learning framework software (e.g., PyTorch, TensorFlow, Caffe, etc.), and/or other machine learning applications used in conjunction with one or more embodiments.

In at least one embodiment, any of configuration manager 1134, resource manager 1136, and resource orchestrator 1112 may implement any number and type of self-modifying actions based on any amount and type of data acquired in any technically feasible fashion. Self-modifying actions may relieve a data center operator of data center 1100 from making possibly bad configuration decisions and possibly avoiding underutilized and/or poor performing portions of a data center.

The data center 1100 may include tools, services, software or other resources to train one or more machine learning models or predict or infer information using one or more machine learning models according to one or more embodiments described herein. For example, a machine learning model(s) may be trained by calculating weight parameters according to a neural network architecture using software and/or computing resources described above with respect to the data center 1100. In at least one embodiment, trained or deployed machine learning models corresponding to one or more neural networks may be used to infer or predict information using resources described above with respect to the data center 1100 by using weight parameters calculated through one or more training techniques, such as but not limited to those described herein.

In at least one embodiment, the data center 1100 may use CPUs, application-specific integrated circuits (ASICs), GPUs, FPGAs, and/or other hardware (or virtual compute resources corresponding thereto) to perform training and/or inferencing using above-described resources. Moreover, one or more software and/or hardware resources described above may be configured as a service to allow users to train or performing inferencing of information, such as image recognition, speech recognition, or other artificial intelligence services.

Example Network Environments

Network environments suitable for use in implementing embodiments of the disclosure may include one or more client devices, servers, network attached storage (NAS), other backend devices, and/or other device types. The client devices, servers, and/or other device types (e.g., each device) may be implemented on one or more instances of the computing device(s) 1000 of FIG. 10—e.g., each device may include similar components, features, and/or functionality of the computing device(s) 1000. In addition, where backend devices (e.g., servers, NAS, etc.) are implemented, the backend devices may be included as part of a data center 1100, an example of which is described in more detail herein with respect to FIG. 11.

Components of a network environment may communicate with each other via a network(s), which may be wired, wireless, or both. The network may include multiple networks, or a network of networks. By way of example, the network may include one or more Wide Area Networks (WANs), one or more Local Area Networks (LANs), one or more public networks such as the Internet and/or a public switched telephone network (PSTN), and/or one or more private networks. Where the network includes a wireless telecommunications network, components such as a base station, a communications tower, or even access points (as well as other components) may provide wireless connectivity.

Compatible network environments may include one or more peer-to-peer network environments—in which case a server may not be included in a network environment—and one or more client-server network environments—in which case one or more servers may be included in a network environment. In peer-to-peer network environments, functionality described herein with respect to a server(s) may be implemented on any number of client devices.

In at least one embodiment, a network environment may include one or more cloud-based network environments, a distributed computing environment, a combination thereof, etc. A cloud-based network environment may include a framework layer, a job scheduler, a resource manager, and a distributed file system implemented on one or more of servers, which may include one or more core network servers and/or edge servers. A framework layer may include a framework to support software of a software layer and/or one or more application(s) of an application layer. The software or application(s) may respectively include web-based service software or applications. In embodiments, one or more of the client devices may use the web-based service software or applications (e.g., by accessing the service software and/or applications via one or more application programming interfaces (APIs)). The framework layer may be, but is not limited to, a type of free and open-source software web application framework such as that may use a distributed file system for large-scale data processing (e.g., "big data").

A cloud-based network environment may provide cloud computing and/or cloud storage that carries out any combination of computing and/or data storage functions described herein (or one or more portions thereof). Any of these various functions may be distributed over multiple locations from central or core servers (e.g., of one or more data centers that may be distributed across a state, a region, a country, the globe, etc.). If a connection to a user (e.g., a client device) is relatively close to an edge server(s), a core server(s) may designate at least a portion of the functionality to the edge server(s). A cloud-based network environment may be private (e.g., limited to a single organization), may be public (e.g., available to many organizations), and/or a combination thereof (e.g., a hybrid cloud environment).

The client device(s) may include at least some of the components, features, and functionality of the example computing device(s) 1000 described herein with respect to FIG. 10. By way of example and not limitation, a client device may be embodied as a Personal Computer (PC), a laptop computer, a mobile device, a smartphone, a tablet computer, a smart watch, a wearable computer, a Personal Digital Assistant (PDA), an MP3 player, a virtual reality headset, a Global Positioning System (GPS) or device, a video player, a video camera, a surveillance device or system, a vehicle, a boat, a flying vessel, a virtual machine, a drone, a robot, a handheld communications device, a hospital device, a gaming device or system, an entertainment system, a vehicle computer system, an embedded system controller, a remote control, an appliance, a consumer electronic device, a workstation, an edge device, any combination of these delineated devices, or any other suitable device.

The disclosure may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. The disclosure may be practiced in a variety of system configurations, including hand-held devices, consumer electronics, general-purpose computers, more specialty computing devices, etc. The disclosure may also be practiced in distributed computing environments where tasks are performed by remote-processing devices that are linked through a communications network.

As used herein, a recitation of "and/or" with respect to two or more elements should be interpreted to mean only one element, or a combination of elements. For example, "element A, element B, and/or element C" may include only element A, only element B, only element C, element A and element B, element A and element C, element B and element C, or elements A, B, and C. In addition, "at least one of element A or element B" may include at least one of element A, at least one of element B, or at least one of element A and at least one of element B. Further, "at least one of element A and element B" may include at least one of element A, at least one of element B, or at least one of element A and at least one of element B.

The subject matter of the present disclosure is described with specificity herein to meet statutory requirements. However, the description itself is not intended to limit the scope of this disclosure. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

What is claimed is:

1. A method comprising:
   determining, based at least on first sensor data obtained using a machine, a wheel angle associated with the machine;
   determining, based at least on the wheel angle, a curvature associated with a path of the machine;
   determining, based at least on the curvature, a lane geometry associated with a lane of the machine that corresponds to the path of the machine, the lane geometry being defined using at least a first boundary that is spaced a first distance with respect to the path and a second boundary that is spaced a second distance with respect to the path;
   determining, based at least on the first boundary, a third distance between a current location of the machine and a point that is located farther along the path than the current location of the machine;
   determining, based at least on second sensor data obtained using the machine, a location associated with an object;
   determining, based at least on the third distance and the location associated with the object, that the object is located along the path of the machine; and
   causing, based at least on the object being located along the path of the machine, the machine to navigate along at least a portion of the path.

2. The method of claim 1, wherein boundaries are instantiated to represent the lane geometry based at least on the curvature, the boundaries being instantiated at least, by:
   instantiating the first boundary at the first distance to a first side of the lane according to the curvature; and
   instantiating the second boundary at the second distance to a second side of the lane according to the curvature.

3. The method of claim 1, further comprising:
   determining, based at least on the location associated with the object, a fourth distance to the object; and
   determining that the fourth distance is less than the third distance,
   wherein the determining that the object is located along the path of the machine is based at least on the fourth distance being less than the third distance.

4. The method of claim 1, further comprising:
   determining, based at least on the third distance and the location associated with the object, a lateral distance between the object and the path,
   wherein the determining that the object is located along the path of the machine is based at least on the lateral distance.

5. The method of claim 4, further comprising:
   determining that the lateral distance is less than a threshold distance,
   wherein the determining that the object is located along the path of the machine is based at least on the lateral distance being less than the threshold distance.

6. The method of claim 4, further comprising:
   determining, based at least on the third distance, an angle associated with the path,
   wherein the determining the lateral distance is further based at least on the angle associated with the path.

7. The method of claim 6, further comprising:
   determining, based at least on the location associated with the object, a fourth distance to the object and a second angle associated with the object,
   wherein the determining the lateral distance is further based at least on the fourth distance to the object and the second angle associated with the object.

8. The method of claim 1, further comprising:
   determining a wheelbase associated with the machine; and
   determining, based at least on the wheel angle, a turning radius associated with the machine,
   wherein the determining the curvature associated with the path of the machine comprises determining, based at least on the wheelbase and the turning radius, the curvature associated with the path of the machine.

9. A system comprising:
   one or more processors configured to:
      determine, based at least on first sensor data obtained using a machine, a yaw rate associated with the machine;
      determine, based at least on the yaw rate, a curvature associated with a path of the machine;

determine, based at least on the curvature, a lane geometry associated with a lane of the machine that corresponds to the path, the lane geometry being defined using at least a first boundary that is spaced a first distance with respect to the path and a second boundary that is spaced a second distance with respect to the path;

determine, based at least on the first boundary, a third distance between a current location of the machine on the path and a point that is located farther along the path than the current location of the machine;

determine, based at least on second sensor data obtained using the machine, a location associated with an object;

determine, based at least on the third distance and the location associated with the object, whether the object is located along the path of the machine; and cause, based at least on whether the object is located along the path of the machine, the machine to navigate along at least a portion of the path.

10. The system of claim 9, wherein the one or more processors are further configured to:

determine a fourth distance from the current location of the machine to the location associated with the object, wherein the determination of whether the object is located along the path of the machine is based at least on the third distance and the fourth distance.

11. The system of claim 10, wherein the one or more processors are further configured to:

determine whether the fourth distance is less than the third distance, wherein the determination of whether the object is located along the path of the machine is based at least on whether the fourth distance is less than the third distance.

12. The system of claim 9, wherein the one or more processors are further configured to:

determine, based at least on the third distance and the location associated with the object, a lateral distance between the object and the path, wherein the determination of whether the object is located along the path of the machine is based at least on the lateral distance.

13. The system of claim 12, wherein the determination of whether the object is located along the path of the machine comprises:

determining that the lateral distance is less than a threshold distance; and determining, based at least on the lateral distance being less than the threshold distance, that the object is located along the path of the machine.

14. The system of claim 12, wherein the determination of whether the object is located along the path of the machine comprises:

determining that the lateral distance is greater than a threshold distance; and determining, based at least on the lateral distance being greater than the threshold distance, that the object is not located along the path of the machine.

15. The system of claim 9, wherein the one or more processors are further configured to:

determine a wheelbase associated with the machine; and determine, based at least on the yaw rate, a turning radius associated with the machine, wherein the determination of the curvature associated with the path of the machine comprises determining, based at least on the wheelbase and the turning radius, the curvature associated with the path of the machine.

16. The system of claim 9, wherein the system is comprised in at least one of:

a control system for an autonomous or semi-autonomous machine;

a perception system for an autonomous or semi-autonomous machine;

a system for performing simulation operations;

a system for performing digital twin operations;

a system for performing light transport simulation;

a system for performing collaborative content creation for 3D assets;

a system for performing deep learning operations;

a system implemented using an edge device;

a system implemented using a robot;

a system for performing conversational AI operations;

a system implementing one or more large language models (LLMs);

a system for generating synthetic data;

a system incorporating one or more virtual machines (VMs);

a system implemented at least partially in a data center; or a system implemented at least partially using cloud computing resources.

17. One or more processors comprising processing circuitry to:

determine, based at least on first sensor data obtained using a machine, a wheel angle associated with the machine;

determine, based at least on the wheel angle, a curvature associated with a path of the machine;

determine, based at least on the curvature, a lane geometry that corresponds to the path and is defined using boundaries that are spaced one or more first distances with respect to the path;

determine, based at least on one of the boundaries, a second distance between a current location of the machine and a point located farther along the path than the current location of the machine;

determine, based at least on second sensor data obtained using the machine, a location associated with an object;

determine, based at least on the second distance and the location associated with the object, whether the object is located along the path; and cause, based at least on whether the object is located along the path, the machine to navigate along at least a portion of the path.

18. The one or more processors of claim 17, wherein the one or more processors are comprised in at least one of:

a control system for an autonomous or semi-autonomous machine;

a perception system for an autonomous or semi-autonomous machine;

a system for performing simulation operations;

a system for performing digital twin operations;

a system for performing light transport simulation;

a system for performing collaborative content creation for 3D assets;

a system for performing deep learning operations;

a system implemented using an edge device;

a system implemented using a robot;

a system for performing conversational AI operations;

a system implementing one or more large language models (LLMs);

a system for generating synthetic data;

a system incorporating one or more virtual machines (VMs);

a system implemented at least partially in a data center; or a system implemented at least partially using cloud computing resources.

19. The system of claim 9, wherein the third distance between the current location of the machine and the point that is located farther along the path is associated with a maximum line of sight along the path for the machine that is caused by the first boundary.

20. The one or more processors of claim 17, wherein the processing circuitry is further to:

determine, based at least on the second distance and the location associated with the object, a lateral distance between the object and the path, wherein the determination of whether the object is located along the path is based at least on the lateral distance.

\* \* \* \* \*